US008477385B2

(12) United States Patent
Takahashi et al.

(10) Patent No.: US 8,477,385 B2
(45) Date of Patent: Jul. 2, 2013

(54) IMAGE READING APPARATUS WITH SUBSTRATE SUPPORT, IMAGE FORMING APPARATUS WITH SUBSTRATE SUPPORT

(75) Inventors: Kaoru Takahashi, Kanagawa (JP); Hironori Shimada, Ebina (JP); Minoru Aoki, Ebina (JP); Masayuki Saito, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 444 days.

(21) Appl. No.: 12/706,037

(22) Filed: Feb. 16, 2010

(65) Prior Publication Data
US 2011/0013213 A1 Jan. 20, 2011

(30) Foreign Application Priority Data

| Jul. 14, 2009 | (JP) | 2009-165667 |
| Jul. 15, 2009 | (JP) | 2009-166818 |
| Jul. 16, 2009 | (JP) | 2009-168165 |
| Jul. 16, 2009 | (JP) | 2009-168166 |

(51) Int. Cl.
*H04N 1/04* (2006.01)
(52) U.S. Cl.
USPC ........... 358/474; 358/471; 358/475; 358/1.13
(58) Field of Classification Search
USPC ................. 358/1.13, 474, 471, 475
See application file for complete search history.

(56) References Cited

U.S. PATENT DOCUMENTS

| 4,783,700 | A | * | 11/1988 | Nagane | 358/482 |
| 5,859,421 | A | * | 1/1999 | Onishi et al. | 250/208.1 |
| 6,166,832 | A | | 12/2000 | Fujimoto | |
| 6,184,513 | B1 | * | 2/2001 | Sawada | 250/208.1 |
| 6,469,808 | B1 | * | 10/2002 | Onishi et al. | 358/475 |
| 7,075,686 | B2 | * | 7/2006 | Hayashi | 358/497 |
| 7,167,284 | B2 | * | 1/2007 | Sawada | 358/483 |
| 7,177,056 | B2 | * | 2/2007 | Matsumoto | 358/474 |
| 7,611,270 | B1 | * | 11/2009 | Lyons et al. | 362/543 |
| 2001/0040203 | A1 | * | 11/2001 | Brock et al. | 248/222.11 |
| 2004/0160646 | A1 | * | 8/2004 | Kudo et al. | 358/484 |
| 2005/0088705 | A1 | | 4/2005 | Okamoto et al. | |
| 2006/0152772 | A1 | * | 7/2006 | Sawada | 358/474 |

FOREIGN PATENT DOCUMENTS

| JP | 61-154057 U | 9/1986 |
| JP | 62-262569 A | 11/1987 |
| JP | 3-110963 A | 5/1991 |

(Continued)

OTHER PUBLICATIONS

Japanese Office Action dated Jun. 26, 2012 for corresponding Japanese Patent Application No. 2009-168166.
Japanese Office Action dated Jun. 26, 2012 for corresponding Japanese Patent Application No. 2009-166818.

(Continued)

*Primary Examiner* — Dennis Dicker
(74) *Attorney, Agent, or Firm* — Sughrue Mion, PLLC

(57) ABSTRACT

An image reading apparatus includes a casing, a light emitting section, a substrate, a support member, and a light guide. The light emitting section includes plural point light sources disposed in a row. The light emitting section is installed to a first face of the substrate. The support member is installed to the casing and supports a second face of the substrate at a projection portion where a position of the light emitting section is projected at the second face of the substrate. The light guide is installed to the casing adjacent to the light emitting section, and guides light from the light emitting section to a read-face.

10 Claims, 20 Drawing Sheets

FOREIGN PATENT DOCUMENTS

| | | | |
|---|---|---|---|
| JP | 3-289861 | A | 12/1991 |
| JP | 5-30293 | A | 2/1993 |
| JP | 6-225081 | A | 8/1994 |
| JP | 9-307696 | A | 11/1997 |
| JP | 2001-77975 | A | 3/2001 |
| JP | 2005-252646 | A | 9/2005 |
| JP | 2006-53340 | A | 2/2006 |
| JP | 2007-318406 | A | 12/2007 |
| JP | 2009-89375 | A | 4/2009 |
| JP | 2009-147586 | A | 7/2009 |
| WO | 97/23991 | A1 | 7/1997 |

OTHER PUBLICATIONS

Japanese Office Action dated Jun. 26, 2012 for corresponding Japanese Patent Application No. 2009-168165.

Japanese Office Action dated Jan. 29, 2013 for corresponding Japanese Patent Application No. 2009-165667.

Japanese Office Action (Notice of Reasons for Rejection) dated Feb. 19, 2013 for corresponding Japanese Patent Application No. 2009-168166.

Japanese Office Action (Decision of Refusal), dated Apr. 23, 2013 JPA No. 2009-165667.

* cited by examiner

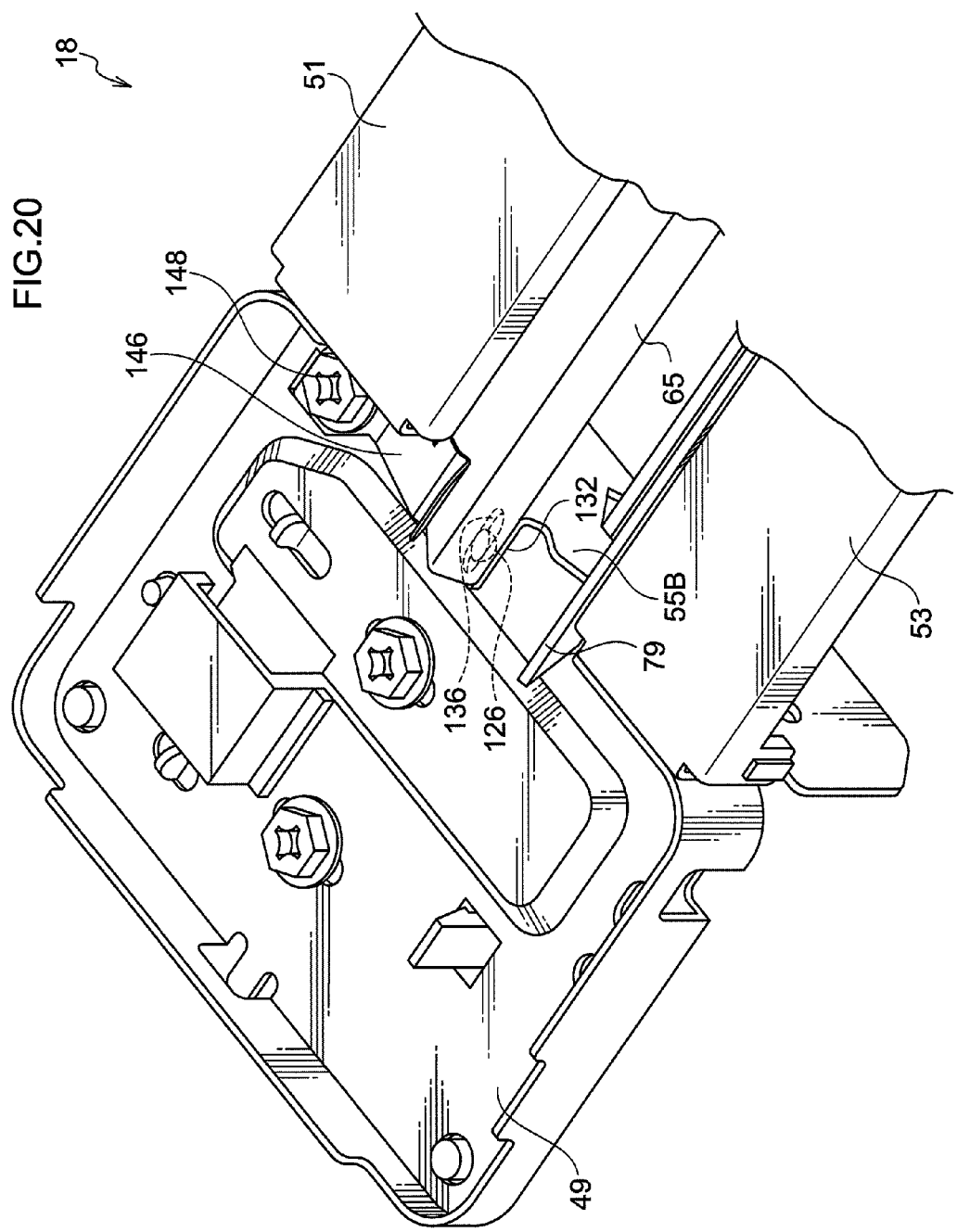

IMAGE READING APPARATUS WITH SUBSTRATE SUPPORT, IMAGE FORMING APPARATUS WITH SUBSTRATE SUPPORT

CROSS-REFERENCE TO RELATED APPLICATIONS

This application is based on and claims priority under 35 USC 119 from Japanese Patent Application Nos. 2009-165667, 2009-166818, 2009-168165 and 2009-168166 filed on Jul. 14, 15, and 16, 2009.

BACKGROUND

1. Technical Field

The present invention relates to an image reading apparatus and an image forming apparatus.

2. Related Art

An image reading apparatus provided with LEDs installed to a substrate, and a light guide that guides light emitted from the LEDs has been proposed. Specifically, configuration is made with the light emitted from the LEDs (point light sources) introduced into the light guide from an incident face of the light guide, and is reflected within the light guide and guided to an emitting face of the light guide.

The image reading apparatus raises the light intensity in a short-axis direction (slow scanning direction) at the face of an original by light emitted from the LED's being reflected in the light guide under conditions of substantially total internal reflection, and guided to the emitting face of the light guide. Further, the shape of the incident face of the light guide is optimized so that a light guide shape is obtained in which the illumination light is illuminated at a uniform intensity onto the original face by controlling the angle of light-rays in a long-axis direction (fast scanning direction). Furthermore, a reflecting portion is provided at the opposite side to the emitting side of the light guide, in order to raise the light illumination efficiency onto the image reading target region.

In the image reading apparatus, in order to ensure precision of reading, it is necessary to suppress fluctuations in the position and fluctuations in light intensity of the light source that irradiates light onto the image. However, when plural light sources, such as LED's or the like, are disposed in a row on one face of a substrate, if the substrate deforms due to heat given by the light sources, the position of the light sources may change and the light source intensity may also change.

SUMMARY

An aspect of the present invention is an image reading apparatus including: a casing; a light emitting section including plural point light sources disposed in a row; a substrate in which the light emitting section is installed to a first face of the substrate; a support member that is installed to the casing and supports a second face of the substrate at a projection portion where a position of the light emitting section is projected at the second face of the substrate; and a light guide that is installed to the casing adjacent to the light emitting section, and that guides light from the light emitting section to a read-face.

BRIEF DESCRIPTION OF THE DRAWINGS

Exemplary embodiments of the present invention will be described in detail based on the following figures, wherein:

FIG. 20 is an enlarged perspective view showing the light guide member in a fixed state mounted on the mounting portion of the other of the side plates according to the exemplary embodiment.

DETAILED DESCRIPTION

Explanation will now be given of exemplary embodiments, based on the drawings.

Configuration of Image Forming Apparatus

Figure 1:
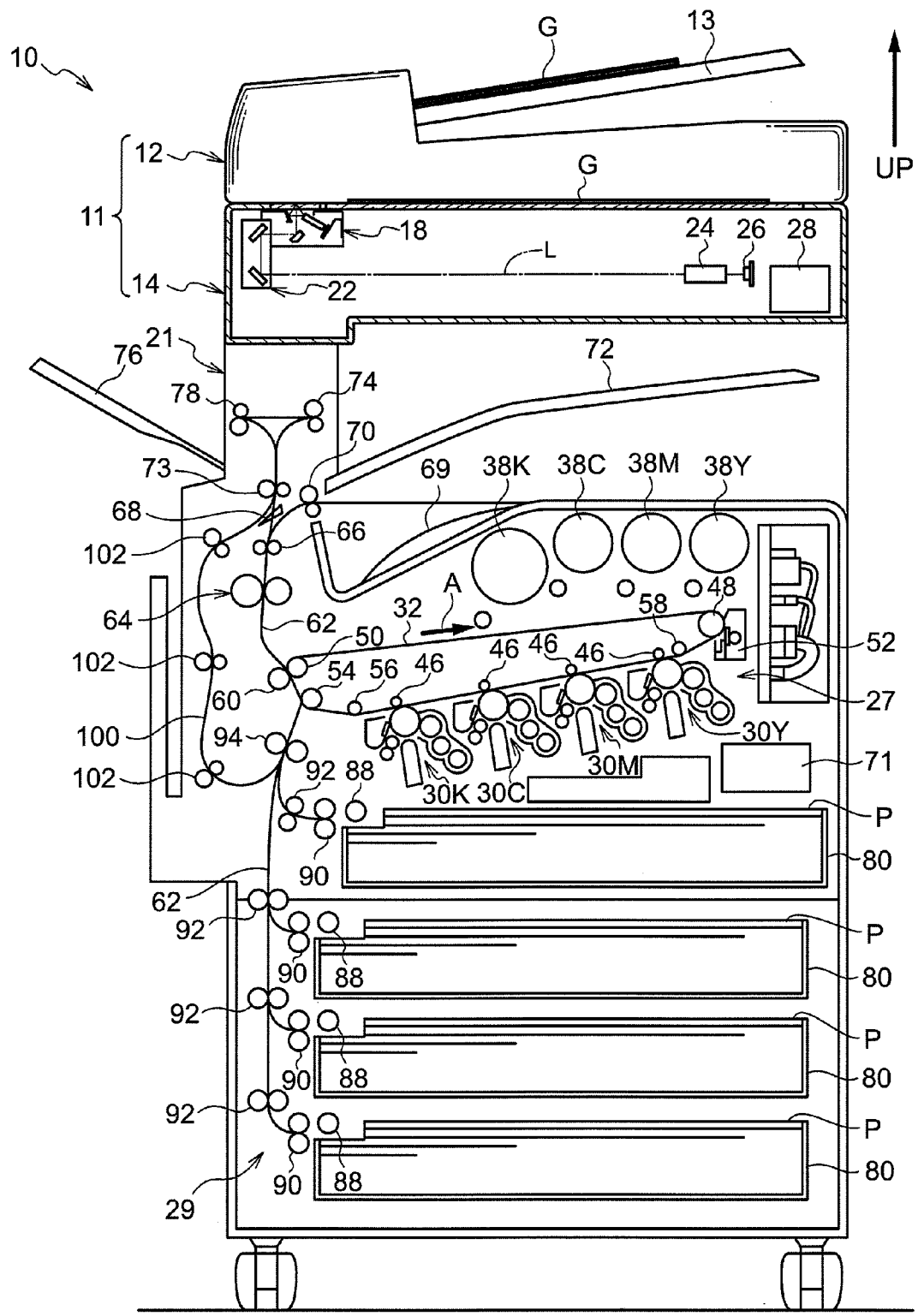
FIG. 1 is a schematic diagram showing an overall configuration of an image forming apparatus according to the exemplary embodiment.

First, a configuration of an image forming apparatus according to an exemplary embodiment will be explained. FIG. 1 is a schematic diagram showing a configuration of the image forming apparatus.

An image forming apparatus 10, as shown in FIG. 1, is equipped with an image reading device 11 that reads in an image of an original G and an image recording device 21 that records an image on a recording medium (sheet) P, such as paper. The image reading device 11 is disposed at the upper portion of the image forming apparatus 10, and the image recording device 21 is disposed at the bottom portion of the image forming apparatus 10. Note that in the drawings the arrow UP indicates the vertically upward direction.

The image reading device 11 is configured to read in an image of the original G, and to convert the read image into an image signal. The image recording device 21 records an image on the recording medium P, based on the image signal converted by the image reading device 11.

Configuration of the Image Recording Device

The image recording device 21, as shown in FIG. 1, is equipped with: plural recording medium storage sections 80 storing the recording medium P, such as paper or the like; an image forming section 27 that forms an image on the recording medium P; a conveying section 29 that conveys the recording medium P from the plural recording medium storage sections 80 towards the image forming section 27; a first discharge section 69, a second discharge section 72, and a third discharge section 76, into which the recording medium P, formed with an image by the image forming section 27, is discharged; and a control section 71 that controls the operation of each section of the image recording device 21.

The image forming section 27 is equipped with: image forming units 30Y, 30M, 30C, and 30K that form toner images of each of the colors yellow (Y), magenta (M), cyan (C), and black (K), respectively; an intermediate transfer belt 32, as an example of an intermediate transfer member onto which the toner images, formed in the image forming units 30Y, 30M, 30C, and 30K, are transferred; primary transfer rolls 46, as an example of primary transfer members for transferring the toner images formed by the image forming units 30Y, 30M, 30C, and 30K onto the intermediate transfer belt 32; a secondary transfer roll 60, as an example of a secondary transfer member, for transferring the toner images, transferred onto the intermediate transfer belt 32 by the primary transfer rolls 46, from the intermediate transfer belt 32 onto the recording medium P; and a fixing device 64 that fixes the toner images transferred onto the recording medium P from the intermediate transfer belt 32 by the secondary transfer roll 60.

Figure 2:
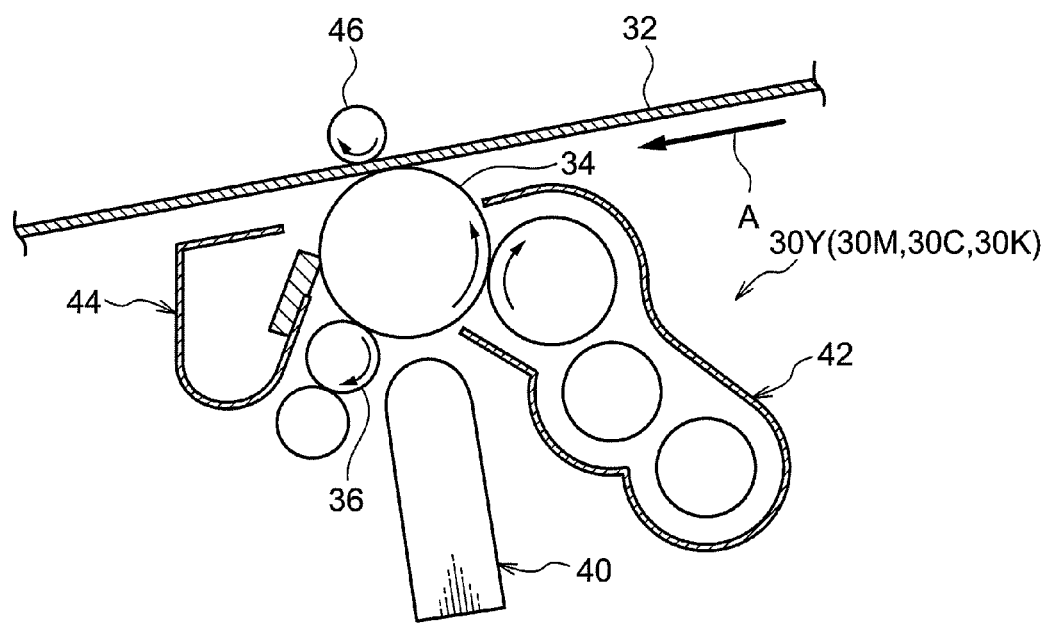
FIG. 2 is a schematic diagram showing a configuration of an image forming unit according to the exemplary embodiment.

The image forming units 30Y, 30M, 30C, and 30K are disposed in a row at a central portion in the vertical direction of the image recording device 21, the row being in an inclined state to the horizontal direction. Each of the image forming units 30Y, 30M, 30C, and 30K, as shown in FIG. 2, has a respective photoreceptor drum 34 that rotates in one direction (anti-clockwise in FIG. 1), as an image holding member that holds the formed toner image.

Around the periphery of each of the photoreceptor drums 34, in sequence from the rotation direction upstream side of the photoreceptor drum 34, are provided: a charging device 36 that electrically charges the photoreceptor drum 34; a exposing device 40 that exposes the photoreceptor drum 34 charged by the charging device 36, forming a latent image on the photoreceptor drum 34; a developing device 42 that develops the latent image formed on the photoreceptor drum 34 by the exposing device 40, forming a toner image: and a cleaning device 44 that removes any toner remaining on the photoreceptor drum 34 after the toner image formed on the photoreceptor drum 34 has been transferred onto the intermediate transfer belt 32.

The exposing device 40 forms an electrostatic latent image based on the image signal transmitted from the control section 71 (see FIG. 1). The image signal transmitted from the control section 71 may be an image signal generated in the image reading device 11, or an image signal the control section 71 acquired from an external device.

The intermediate transfer belt 32, as shown in FIG. 1, is disposed above the image forming units 30Y, 30M, 30C, and 30K, and is entrained with a predetermined tension around a drive roll 48 that imparts driving force to the intermediate transfer belt 32, a facing roll 50 that faces the secondary transfer roll 60, a tensioning roll 54 that imparts tension to the intermediate transfer belt 32, a first driven roll 56, and a second driven roll 58.

The intermediate transfer belt 32 is imparted with a rotational force by the drive roll 48, and circulates in one direction (the direction of arrow A in FIG. 1), while making contact with the photoreceptor drums 34.

A cleaning device 52 is provided for removing any toner remaining on the intermediate transfer belt 32, at a facing position that faces the drive roll 48, with the intermediate transfer belt 32 interposed therebetween.

Toner cartridges 38Y, 38M, 38C, and 38K are provided above the intermediate transfer belt 32, for storing each color of toner for supply to each of the colors of developing device 42, yellow (Y), magenta (M), cyan (C), and black (K).

The primary transfer rolls 46 face the respective photoreceptor drums 34, with the intermediate transfer belt 32 interposed therebetween. There are primary transfer positions between the primary transfer roll 46 and the photoreceptor drums 34, where the toner images formed on the photoreceptor drums 34 are transferred to the intermediate transfer belt 32.

The secondary transfer roll 60 faces the facing roll 50, with the intermediate transfer belt 32 interposed therebetween. There is a secondary transfer position between the secondary transfer roll 60 and the facing roll 50, where the toner images that have been transferred to the intermediate transfer belt 32 are transferred to the recording medium P.

The conveying section 29 is provided with feeder rolls 88 that feed out the recording medium P stored in each of the recording medium storage sections 80; a conveying path 62 that conveys the recording medium P fed out from the feeder rolls 88; and conveying rolls 90, 92, 94, disposed along the conveying path 62 and conveying the recording medium P that has been fed out by the feeder rolls 88 to the secondary transfer position.

The fixing device 64 is disposed further downstream in the conveying direction than the secondary transfer position, and fixes the toner image transferred at the secondary transfer position to the recording medium P.

Conveying rolls 66, which convey the recording medium P fixed with the toner image, are provided further to the conveying direction downstream side of the fixing device 64. A switching member 68 is provided at the conveying direction downstream side of the conveying rolls 66, for switching the conveying direction of the recording medium P. First discharge rolls 70 are provided at the conveying direction downstream side of the switching member 68, to convey the recording medium P which is switched to one direction (the right direction in FIG. 1) in the conveying direction by the switching member 68, and to discharge the recording medium P to the first discharge section 69.

At the conveying direction downstream side of the switching member 68 are provided: conveying rolls 73 that convey the recording medium P which is switched to another direction (the upper direction in FIG. 1) in the conveying direction by the switching member 68; second discharge rolls 74 that discharge the recording medium P, conveyed by the conveying rolls 73, to the second discharge section 72; and third discharge rolls 78 that discharge the recording medium P conveyed by the conveying rolls 73 to the third discharge section 76.

A reverse conveying path 100 is formed at the side of the fixing device 64, that conveys the recording medium P reversed by the conveying rolls 73. Plural conveying rolls 102 are provided along the reverse conveying path 100. The recording medium P conveyed by the conveying rolls 102 is fed into the secondary transfer position for a second time by the conveying rolls 94.

Explanation will now be given regarding the image forming operation that forms an image on the recording medium P, in the image recording device 21 according to the exemplary embodiment.

In the image recording device 21, the recording medium P fed out from one of the plural recording medium storage sections 80 is fed into the secondary transfer position by the conveying rolls 90, 92, 94.

In each of the image forming units 30Y, 30M, 30C, and 30K, the exposing device 40 forms an electrostatic latent image on the photoreceptor drum 34, based on an image signal acquired from the image reading device 11 or an external device, and a toner image is formed based on this electrostatic latent image. Each of the toner images formed on the image forming units 30Y, 30M, 30C, and 30K are superimposed on the intermediate transfer belt 32 at the primary transfer positions, thereby forming a color image. The color image formed on the intermediate transfer belt 32 is then transferred to the recording medium P at the secondary transfer position.

The recording medium P, to which the toner image has been transferred, is conveyed to the fixing device 64, and the transferred toner image is fixed by the fixing device 64. After the toner image has been fixed, when an image is only to be formed on a single side of the recording medium P, the recording medium P is discharged to one of the first discharge section 69, the second discharge section 72, or the conveying rolls 73.

However, when images are to be formed to both sides of the recording medium P, the recording medium P is reversed by the conveying rolls 73 after the image has been formed to one side, and fed towards the reverse conveying path 100. The recording medium P is then fed from the reverse conveying path 100 into the secondary transfer position a second time by the conveying rolls 94, and an image is formed on the reverse face of the recording medium P in a similar manner to as described above, thereby forming images on both sides of the recording medium P. A cycle of the image forming operation is performed as described above.

The configuration of the image recording device 21 is not limited to the configuration described above. An image forming apparatus of other configuration to that of the configuration described above may be employed, as long as it is an image forming apparatus capable of recording an image. For example, a direct transfer image recording device that has no intermediate transfer member, an inkjet image recording device, or the like, may be employed.

Configuration of the Image Reading Device

Figure 3:
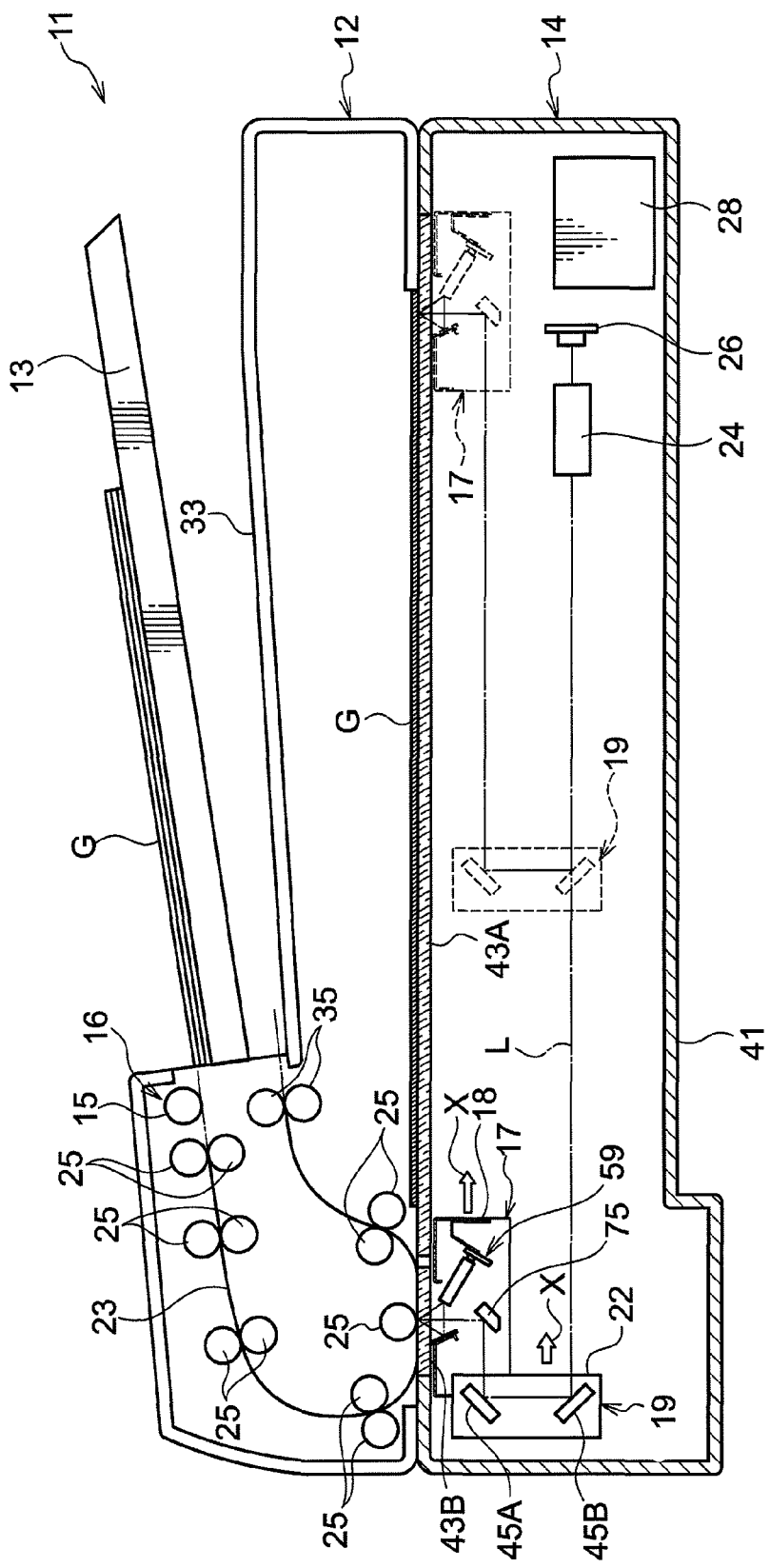
FIG. 3 is a schematic diagram showing a configuration of an image reading apparatus according to the exemplary embodiment.

The image reading device 11, as shown in FIG. 3, is equipped with an original conveying device 12 that conveys the original G, and an image reading section 14 that reads in an image from the original G conveyed by the original conveying device 12. The original conveying device 12 is disposed at the upper portion of the image reading device 11, with the image reading section 14 disposed bottom portion the image reading device 11.

The original conveying device 12 is equipped with: an original storage section 13 in which the original G is stored, an original discharge section 33 to which the original G is discharged, and a conveying section 16 that conveys the original G from the original storage section 13 to the original discharge section 33.

The conveying section 16 is equipped with: a feeder roll 15 that feeds the original G stored in the original storage section 13 out from the original storage section 13; plural conveying rolls 25 that convey the original G, fed out by the feeder roll 15, toward the conveying direction downstream side; and discharge rolls 35 that discharge the original G conveyed by the conveying rolls 25 into the original discharge section 33. The plural conveying rolls 25 and the discharge rolls 35 are disposed along a conveying path 23, along which the original G, fed out from the original storage section 13, is conveyed.

The image reading section 14 is equipped with various components housed in a casing 41, configured so as to read in images on both an original G conveyed by the original conveying device 12, and on an original G placed on a first platen glass 43A, described below.

At a top portion of the casing 41 are provided: the first platen glass 43A, as an example of a first transparent member, on which an original G is placed and through which light L passes for reading in the image on the original G; and a second platen glass 43B, as an example of a second transparent member, through which light L passes for reading in the image on an original G conveyed by the original conveying device 12.

The original conveying device 12 is installed to the image reading section 14 so as to be capable of opening and closing, such that an original G may be placed on the first platen glass 43A when the original conveying device 12 is in the open state.

The image reading section 14 is equipped with: a light illumination unit 17 that illuminates light L onto the face to be read (image face) of an original G; a light guide unit 19 that guides light L from the light illumination unit 17 onto the read-face of the original G, and guides reflected light L, reflected from the read-face of the original G; a imaging lens 24 that focuses the optical image of the light L guided by the light guide unit 19; and a detector 26 that detects the optical image focused by the imaging lens 24.

The light illumination unit 17 is equipped with: a first carriage 18, as an example of a moving member capable of moving along the first platen glass 43A; a light illumination section 59 provided to the first carriage 18 that illuminates light L onto an original G; and a first mirror 75 provided to the first carriage 18 that reflects the reflected light L reflected by the original G. A specific configuration of the light illumination unit 17 is described later.

The light guide unit 19 is equipped with: a second carriage 22, as an example of another moving member capable of moving along the first platen glass 43A; a second mirror 45A provided to the second carriage 22, that reflects the reflected light L reflected by the first mirror 75; and a third mirror 45B provided to the second carriage 22, that reflects the reflected light L reflected by the second mirror 45A, toward the imaging lens 24.

The detector 26 is configured by a photoelectric conversion element, such as a Charge Coupled Device (CCD) image sensor, or the like, that performs photoelectric conversion on the light L focused by the imaging lens 24.

An electrical signal obtained by the detector 26 is transmitted to an image processing device 28 electrically connected to the detector 26. In the image processing device 28, the electrical signal is image processed, and the image-processed electrical signal (image signal) is transmitted to the exposing devices 40 (see FIG. 2) via the control section 71 (see FIG. 1).

Configuration of the Light Illumination Unit

The light illumination unit 17, as described above, is equipped with the first carriage 18 (see FIG. 4), as an example of a moving member capable of movement in a slow scanning direction (direction X in FIG. 4) along the first platen glass 43A. In cases where an original G is placed on the first platen glass 43A, the first carriage 18 moves along the read-face of the original G.

Figure 5:
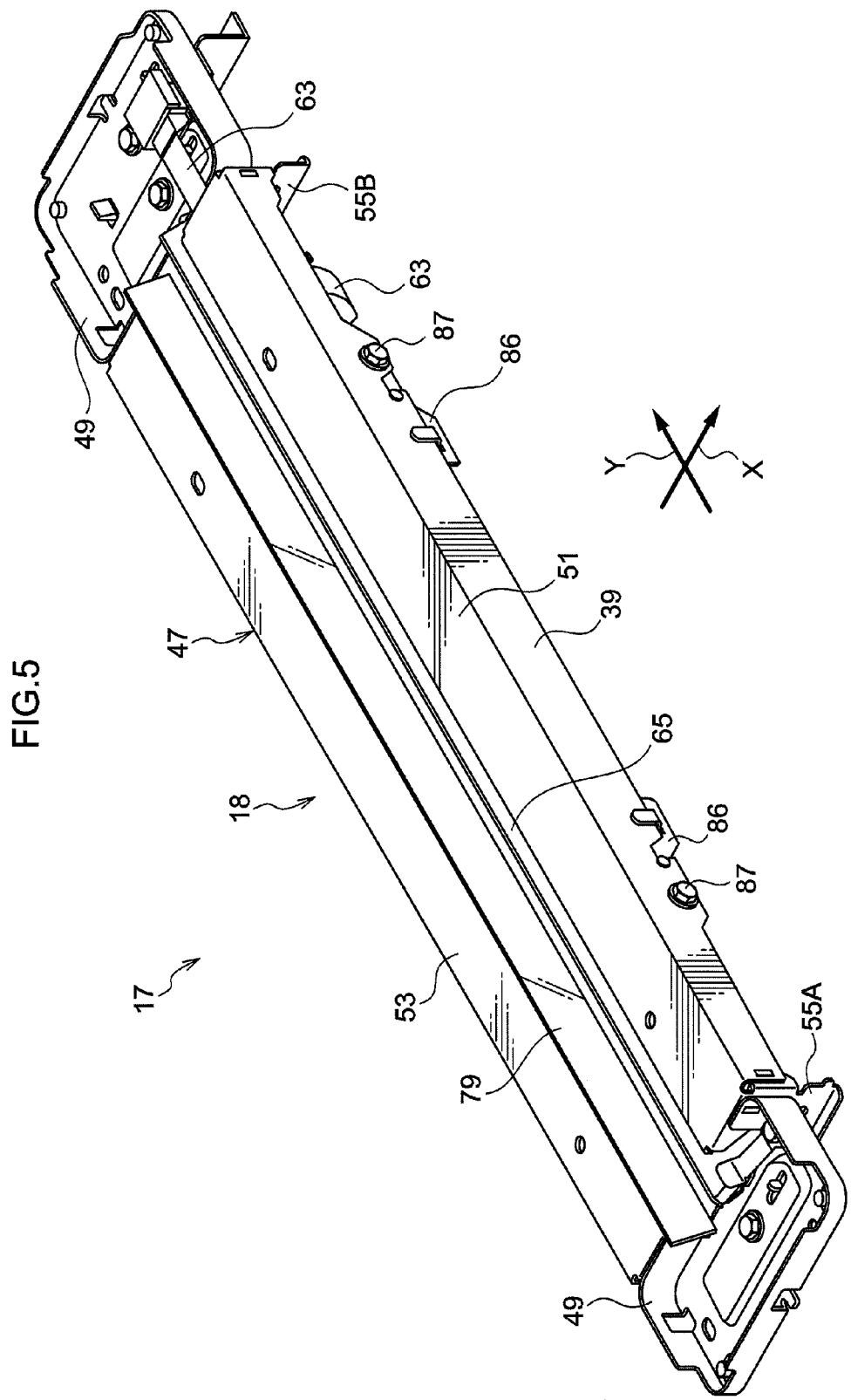
FIG. 5 is a perspective view showing a configuration of the light illumination unit according to the exemplary embodiment.

The first carriage 18, as shown in FIG. 5, is equipped with a carriage body 47, formed in a shape elongated along a fast scanning direction (direction Y in FIG. 5), and with a pair of support members 49 disposed at both length direction ends of the carriage body 47. This pair of support members 49 are supported on a frame (not shown in the figures) provided to the casing 41 (see FIG. 3) of the image reading section 14 so that the frame is capable of moving in the slow scanning direction (direction X in FIG. 5) along the first platen glass 43A. The carriage body 47 and the pair of support members 49 are, for example, formed from sheet metal (plate).

The carriage body 47 is equipped with a pair of side plates, side plate 55A and side plate 55B, disposed facing each other, separated in the fast scanning direction (direction Y in FIG. 5); and a side wall 39, a first top wall 51 and a second top wall 53 that are integrally formed to the side plate 55A and the side plate 55B, and are disposed between the side plate 55A and the side plate 55B.

The first top wall 51 and the second top wall 53 are disposed separated from each other along the slow scanning direction (direction X in FIG. 5), and are formed in an elongated shape along the fast scanning direction (direction Y in FIG.). The first top wall 51 and the second top wall 53 face the second platen glass 43B when reading in an image from an original G conveyed by the original conveying device 12, and the first top wall 51 and the second top wall 53 face the first platen glass 43A when reading in an original G which is placed on the first platen glass 43A.

Figure 4:
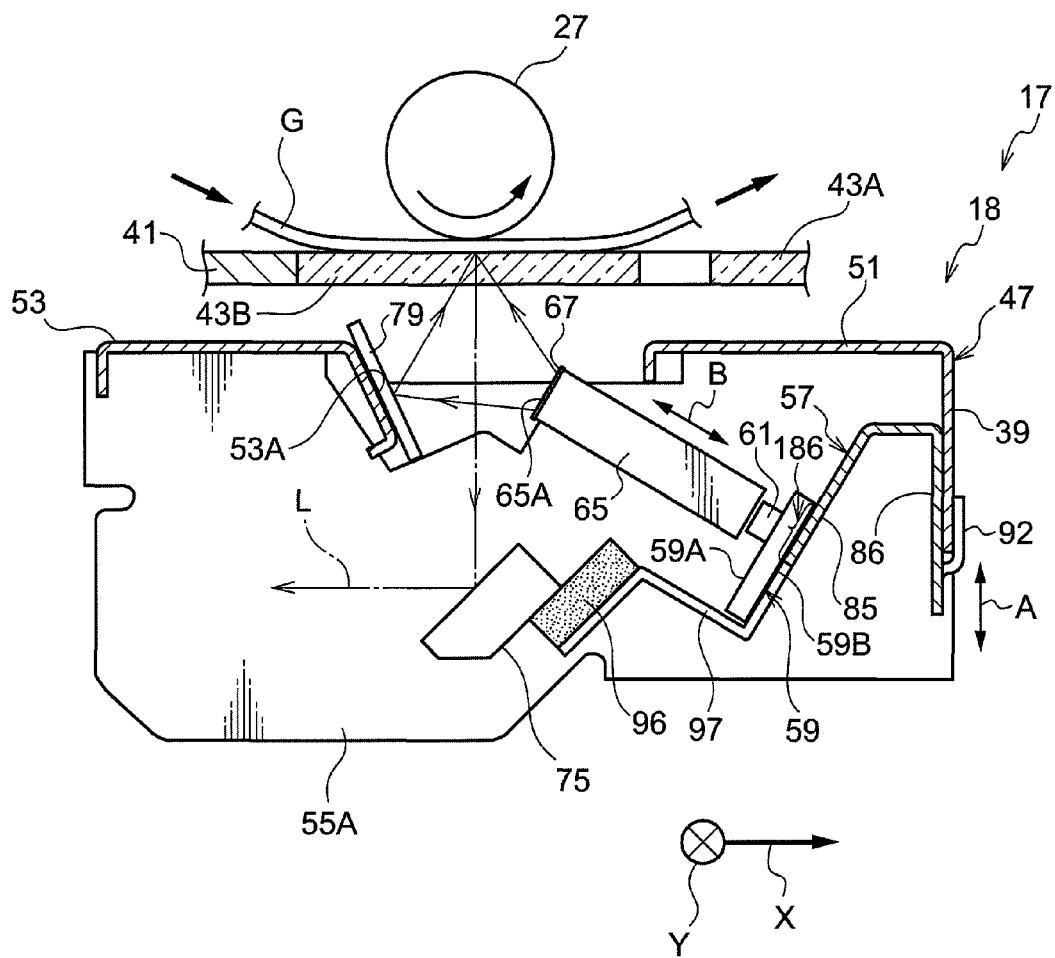
FIG. 4 is a schematic diagram showing a configuration of a light illumination unit according to the exemplary embodiment.

One slow scanning direction edge at the first top wall 51 side of the second top wall 53 is bent so as to form a sloping face 53A (see FIG. 4).

The separation between the side plate 55A and the side plate 55B in the fast scanning direction is greater than the widths of the image forming regions of originals G in the fast scanning direction (see FIG. 4).

The light illumination section 59 that illuminates light L onto the read-face of an original G is installed via a bracket 57, as an example of a support member, to the first carriage 18 at the side wall 39 of the first carriage 18, as shown in FIG. 4. The light illumination section 59 is installed so as to be capable of being installed or uninstalled to the first carriage 18 independently of other components (such as a light guide member 65, described later) that are installed to the first carriage 18. A specific example of an installation structure of the light illumination section 59 to the first carriage 18 is described later.

Figure 6:
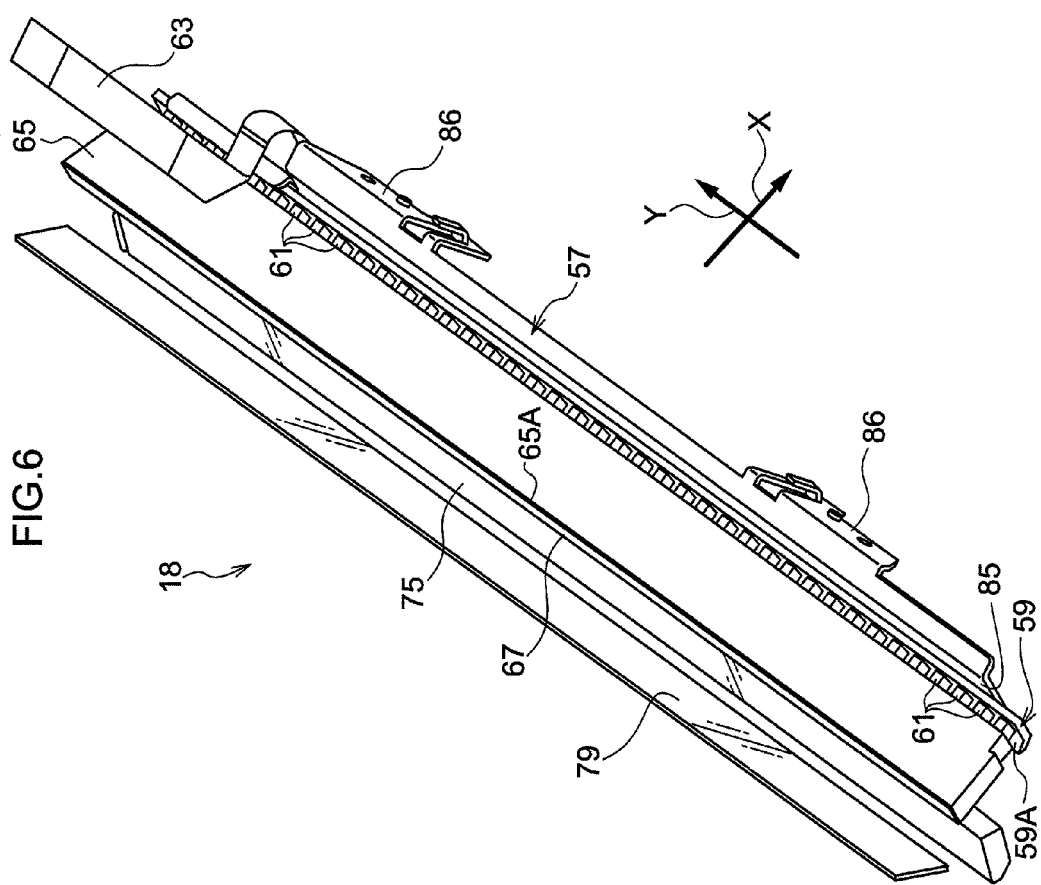
FIG. 6 is a perspective view showing a configuration of various components of the light illumination unit according to the exemplary embodiment.

The light illumination section 59, as shown in FIG. 6, is equipped with a circuit board 59A extending along the fast scanning direction (direction Y in FIG. 6), and with light emitting elements 61, as an example of a light emitting section that emits light towards the read-face of an original G. Plural of the light emitting elements 61 are disposed on the circuit board 59A at uniform intervals along the fast scanning direction.

Light Emitting Diodes (LED's) may, for example, be employed as the light emitting elements 61. The circuit board 59A is supplied with electricity from the control section 71 (see FIG. 1) through a flexible substrate 63 connected to one length direction end of the circuit board 59A.

There is no limitation to disposing the light emitting elements 61 at uniform intervals, and, for example, a configuration may be made in which the light emitting elements 61 are disposed such that the interval therebetween is narrower at portions of the circuit board 59A at both length direction ends than at the center portion thereof.

There is no limitation to employing LED's as the light emitting elements 61, and other light emitting elements may be employed, for example, organic Eletro-Luminescent (EL) elements, non-organic EL elements, or the like.

The bracket 57, as shown in FIG. 4, supports each of the light emitting elements 61 so that they are inclined with respect to the first platen glass 43A and the second platen glass 43B, and light L emitted from the light emitting elements 61 towards an original G is illuminated onto the face of the original G from an inclined direction.

At the light L emitting side of the light emitting elements 61, as shown in FIG. 4 and FIG. 6, the light guide member 65 that guides the light L from the light emitting elements 61 to an original G is disposed facing the light L emitting face of the light emitting elements 61. The light guide member 65 is formed elongated along the fast scanning direction, and is supported at both fast scanning direction ends by the side plates 55A, 55B. A specific example of the installation structure of the light guide member 65 to the first carriage 18 is described later.

The light guide member 65 is disposed within the first carriage 18. Specifically, the light guide member 65 is disposed below the first top wall 51 and further to the side of a reflection plate 79, described later, than the side wall 39.

The light guide member 65 is, for example, formed from acrylic resin. Light L introduced from the light emitting elements 61 undertakes total internal reflection within the light guide member 65, and light L from the light emitting elements 61 is guided to the vicinity of the reading position of an original G (see FIG. 4).

By causing total internal reflection of the light L, as described above, the light guide member 65 emits the light L, from the light emitting elements 61, at a light-emitting face 65A, the face at the opposite side of the light guide member 65 to the face that faces the light emitting elements 61. Variation in the light distribution at the light-emitting face 65A is consequently suppressed, at least in the fast scanning direction.

Since the light guide member 65 guides light L introduced from the light illumination section 59 to the vicinity of the reading position, the light guide member 65 is preferably formed from a material that does not readily attenuate the light intensity. Other materials that may be employed for the light guide member 65 include a polycarbonate resin, a polyimide resin, glass, or the like.

A diffusion plate 67 that diffuses the light L emitted from the light guide member 65 is joined to the light-emitting face 65A of the light guide member 65. The diffusion plate 67 is, for example, formed from an acrylic resin. The light L emitting face of the diffusion plate 67 is formed along the fast scanning direction with undulations (a diffraction pattern) that diffuse the light L introduced from the light-emitting face 65A. By changing the shape of the diffraction pattern, the light L emitted from the diffusion plate 67 can be adjusted into a circular shape or an elliptical shape. Other materials that may be employed for the diffusion plate 67 include a polycarbonate resin, a polyester resin, glass, or the like.

The reflection plate 79 is disposed at a position separated in the slow scanning direction from the diffusion plate 67, such that a portion of the light emitted from the diffusion plate 67 is reflected onto an original G (see FIG. 4). The reflection plate 79 is a mirror-faced member extending along the fast scanning direction, and the opposite face of the reflection plate 79 to the reflection face of the light L is fixed to the sloping face 53A of the second top wall 53 (see FIG. 4).

The first mirror 75 is provided below the light guide member 65 and the diffusion plate 67, and guides the light L reflected by the original G onto the second mirror 45A of the second carriage 22 (see FIG. 3). The first mirror 75 is retained by the two end portions thereof being inserted through holes formed in the side plates 55A, 55B (see FIG. 5).

The light illumination unit 17 is not limited to the above described configuration, and may be configured in another shape and with other components.

Explanation will now be given of an image reading in operation to read in an image of the original G, in the image reading device 11 according to the exemplary embodiment.

In the image reading device 11, when reading in an original G placed on the first platen glass 43A, as shown in FIG. 3, the first carriage 18 of the light illumination unit 17 and the second carriage 22 of the light guide unit 19 move with, for example, proportional movement distances of 2:1 respectively in movement direction (direction X).

At the same time, the light L is illuminated from the light illumination section 59 of the light illumination unit 17 onto the read-face of the original G. Specifically, as shown in FIG. 3, the light L is emitted from each the light emitting elements 61 of the light illumination section 59, the emitted light L propagates within the light guide member 65 while undergoing total internal reflection, and is diffused by the diffusion plate 67. A portion of the light L diffused at the diffusion plate 67 is illuminated onto the original G through the first platen glass 43A, and the light L diffused towards the reflection plate 79, from the light L diffused by the diffusion plate 67, is reflected by the reflection plate 79, and then illuminated onto the original G through the first platen glass 43A. In the light illumination unit 17, light L is illuminated onto the original G from both one side in the slow scanning direction (the right side in FIG. 4) and the other (the left side in FIG. 4).

The light L illuminated onto the original G, after being reflected by the read-face of the original G, is reflected in sequence by the first mirror 75, the second mirror 45A and the third mirror 45B, and guided to the imaging lens 24. The light L guided to the imaging lens 24 is focused on the light-capture face of the detector 26.

Since the movement distance of the second carriage 22 is half the movement distance of the first carriage 18, the length of the light path of the light L from the read-face of the original G to the detector 26 does not change.

The detector 26 is a linear sensor that simultaneously processes one-line's worth of the original G in the fast scanning direction that intersects with the slow scanning direction (the movement direction of the first carriage 18). In the image reading section 14, after one fast scanning direction line has been read in, the first carriage 18 is moved in the slow scanning direction and the next line of the original G is read in. Reading in of one page is completed by execution across the entire face of the original G.

However, when reading in an image of an original G conveyed by the original conveying device 12, as shown in FIG. 3, the first carriage 18 and the second carriage 22 are positioned in a stationary state, positioned at one end of the image reading section 14 (the left end in FIG. 3), as shown by the solid lines.

First, the light L reflected by the first line of the original G conveyed to this reading position is focused by the imaging lens 24, and the image is detected by the detector 26. Namely, after performing processing on the first line in the fast scanning direction at once, using the liner sensor detector 26, the next line in the fast scanning direction of the conveyed original G is read in. Reading in of one page of the original G over the slow scanning direction is completed when the trailing edge of the original G passes through the reading position of the second platen glass 43B.

Installation Structure of the Light Illumination Section to the First Carriage

As shown in FIGS. 4 and 6, the bracket 57 formed by a sheet (plate) metal is provided inside the first top wall 51 and the side wall 39, extending toward the fast scanning direction.

Specifically, the bracket 57 is equipped with a support plate 85 that supports the light illumination section 59 and installation plates 86 integrally formed to the support plate 85 for installation to the side wall 39 of the first carriage 18.

Two installation plates 86 are formed at the side wall 39 side of the bracket 57 so that the installation plates 86 lap over the side wall 39, and the bracket 57 is formed in a shape in which it is opened toward the bottom direction. An example of the bracket 57 includes a shape shown in FIG. 4, in which the cross sectional shape along the slow scanning direction is formed, partially in the fast scanning direction, in a substantially inverted V shape.

Figure 7:
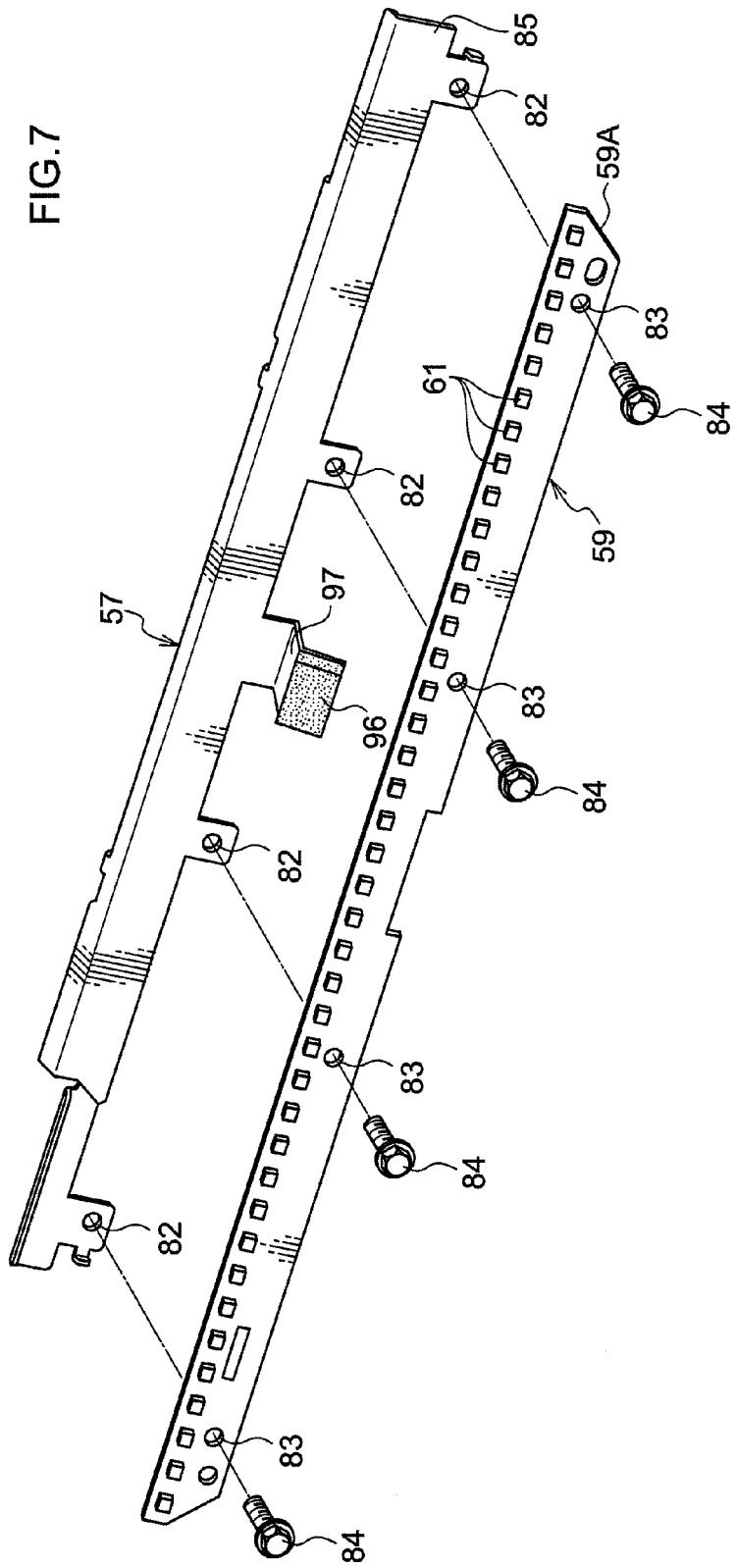
FIG. 7 is a perspective view showing a configuration of a bracket and the light illumination section according to the exemplary embodiment.
Figure 8:
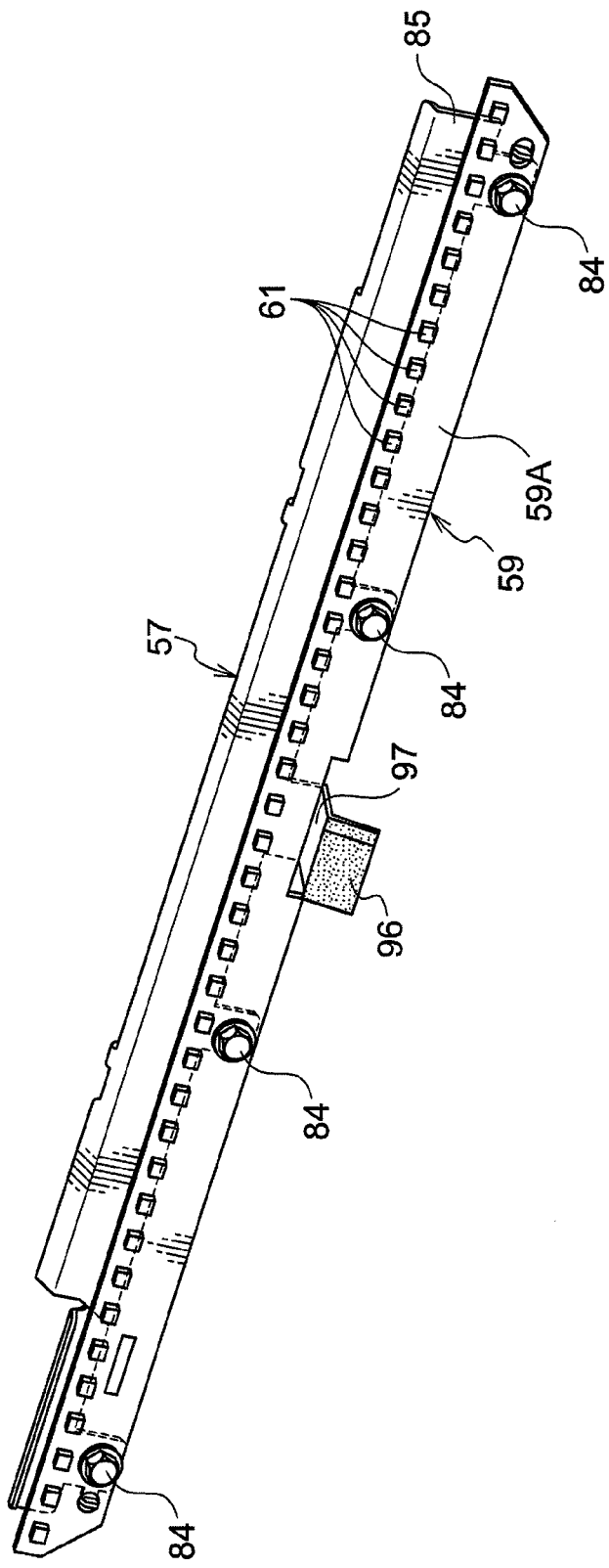
FIG. 8 is a perspective view showing an installed state of the light illumination section with respect to the bracket according to the exemplary embodiment.

Plural (four in the present exemplary embodiment) threaded holes 82 are formed in the support plate 85, as shown in FIG. 7, disposed along the length direction thereof. Plural (four in the present exemplary embodiment) through holes 83 are formed in the circuit board 59A of the light illumination section 59, corresponding to the threaded holes 82. As shown in FIG. 8, the circuit board 59A of the light illumination section 59 is fixed to the support plate 85 by bolts 84 passing through the through holes 83 and being screwed into the threaded holes 82.

Here, in a state in which the light illumination section 59 (the circuit board 59A) in a fixed state to the bracket 57, a projection portion 186 corresponding to a region (position) where the position of the light emitting elements 61 is projected on another face 59B (back face) of the circuit board 59A, is configured to be supported by the support plate 85 of the bracket 57.

When the light emitting elements 61 emit the light L, heat is produced by the light emitting elements 61, and this heat is transmitted to the circuit board 59A. Thus a possibility should be considered that when this heat is absorbed at the light illumination section 59, the temperature of the circuit board 59A might get higher than necessary, resulting in deformation (warping) of the circuit board 59A.

However, as described above, in the state in which the circuit board 59A of the light illumination section 59 supported by the bracket 57, the projection portion 186 which is the region where the position of the light emitting elements 61 is projected on the back face 59B of the circuit board 59A, is supported by the support plate 85 of the bracket 57. Namely, the heat produced by the light emitting elements 61 towards the circuit board 59A is not over-absorbed by the circuit board 59A, and is transmitted to the support plate 85 of the bracket 57, formed in a sheet metal member having relatively high heat transfer rate in comparison to a resin member.

By the heat given off by the light emitting elements 61 towards the circuit board 59A being transmitted to the support plate 85 of the bracket 57, and not over-absorbed by the circuit board 59A, the temperature of the circuit board 59A is suppressed from becoming higher than required.

By suppressing the temperature of the 59A from becoming higher than required, deforming (warping) of the circuit board 59A is suppressed. Namely, the heat produced by the light emitting elements 61 is dissipated by the bracket 57.

By suppressing deformation of the circuit board 59A, the illumination intensity illuminated onto the read-face of the original G by the light emitting elements 61 becomes uniform, and the intended latent image is formed on the surface of the photoreceptor drums 34.

Figure 9:
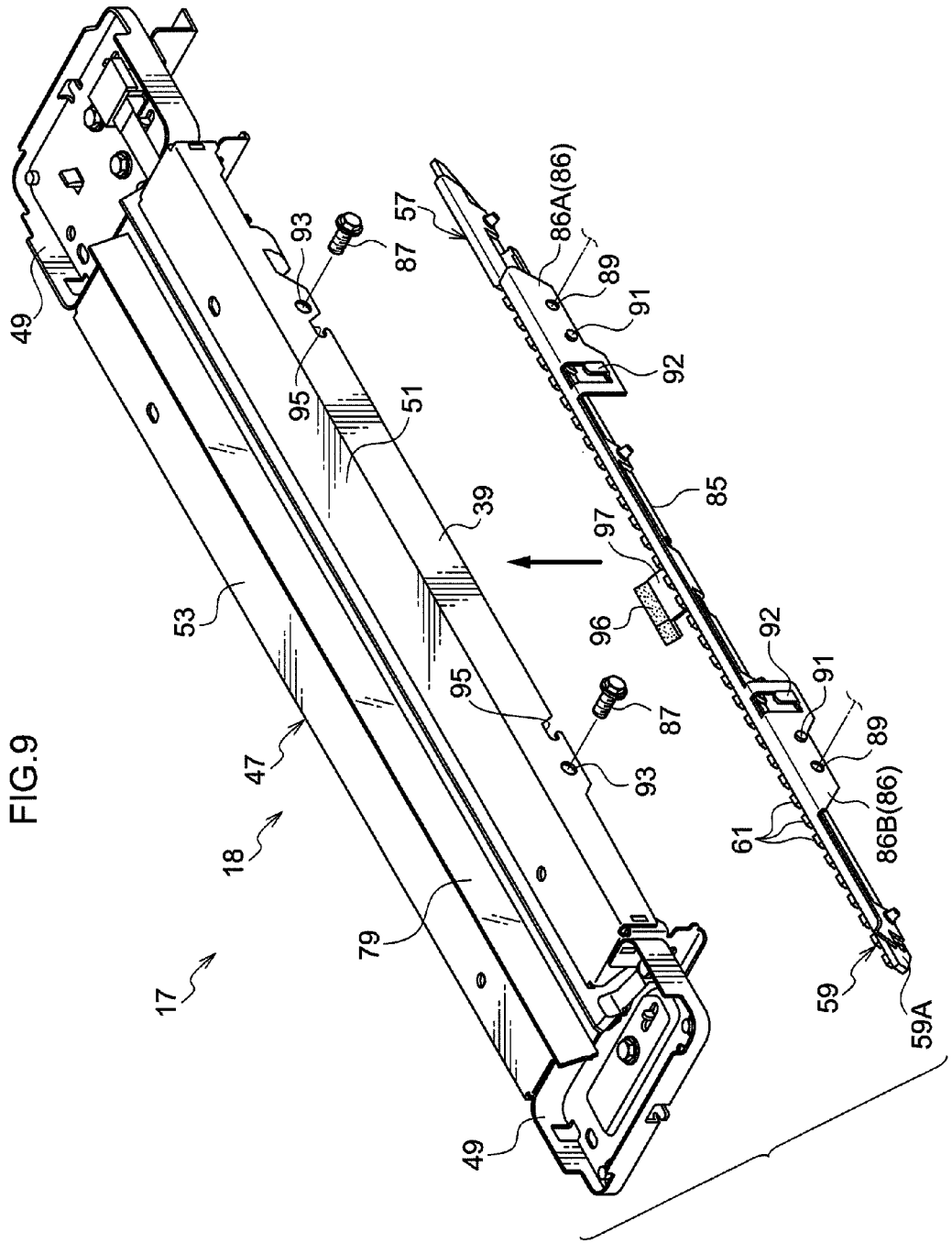
FIG. 9 is a perspective view showing a removed state of the bracket from a first carriage according to the exemplary embodiment.

The installation plates 86 are equipped with an installation plate 86A disposed at one length direction end of the support plate 85 (the right side in FIG. 9), and an installation plate 86B disposed at the other length direction end of the support plate 85 (the left side in FIG. 9).

The installation plates 86A, 86B are respectively formed with a claw 92, as an example of restricting members that restricts movement of the bracket 57 towards the side of other components (for example the light guide member 65) when attaching or detaching the bracket 57.

The claws 92 formed to the installation plates 86A, 86B are respectively disposed toward the length direction center portion of the bracket 57. Namely, the claws 92 formed to the installation plates 86A, 86B are formed at the installation plate 86B side of the installation plate 86A, and at the installation plate 86A side of the installation plate 86B.

The claws 92 each project out upwards from a bottom portion of the respective installation plates 86A, 86B. The side wall 39 of the first carriage 18 is fitted in from the leading ends of the claws 92, and inserted between the two claws 92 and the installation plates 86A, 86B.

The side wall 39 that is inserted between the two claws 92 and the installation plates 86A, 86B makes contact with the base end of the claws 92, and further insertion is restricted.

The side wall 39 that is inserted between the two claws 92 and the installation plates 86A, 86B is held between the two claws 92 and the installation plates 86A, 86B, restricting movement of the bracket 57 in the thickness direction of the installation plates 86A, 86B (movement toward the light guide member 65 side in FIG. 4).

However, with the side wall 39 in an inserted state between the two claws 92 and the installation plates 86A, 86B, movement along the length direction of the side wall 39 of the bracket 57 is permitted.

Protrusions 91, as an example of retained portions, are formed to the installation plates 86A, 86B, at a length direction central portion of the installation plates 86A, 86B, respectively.

Cut-outs 95, as examples of retaining portions that retain the protrusions 91, are formed in the side wall 39 of the first carriage 18. The cut-outs 95 are formed with their open ends at the bottom edge of the side wall 39, and curve around towards one side in the length direction of the side wall 39 (toward the left-bottom side in FIG. 9). Thereby, the cut-outs 95 guide the protrusions 91, inserted into the cut-outs 95 from the bottom edge of the side wall 39, along to the back (recess) of the cut-outs 95 that are at one length direction side of the side wall 39 (left-bottom side in FIG. 9), such that the bracket 57 moves in the fast scanning direction that is not restricted by the claws 92. The protrusions 91 that have been guided to the recess of the cut-outs 95 are held at the top and bottom between the internal walls at the back of the cut-outs 95, and retained in a state where movement toward one length direction side of the side wall 39 is restricted. The bracket 57 is thereby positioned with respect to the side wall 39.

The retaining portions are not limited to the cut-outs 95, and, as long as the retained portions are retained, configurations other than those of the cut-outs 95 may be employed, for example a groove or an elongated hole. The retained portions are not limited to the protrusions 91, and as long as they are retained by the retaining portions, configurations other than those of the protrusions 91 may be employed. Configurations may be made in which the cut-outs 95 are formed as retained portions to the bracket 57, and the protrusions 91 are formed as retaining portions to the side wall 39.

Through holes 93 are formed through the side wall 39 of the first carriage 18. Bolts 87, as an example of light emitting section fixing members, are inserted through the through holes 93 in order to fix the light emitting elements 61 to the first carriage 18.

Threaded holes 89 are formed, corresponding to the through holes 93, in the installation plates 86A, 86B, at the bracket 57 length direction ends sides of the installation plates 86A, 86B (the opposite side to the claws 92 from the protrusions 91). In the state where the protrusions 91 are retained in the cut-outs 95, the threaded holes 89 and the through holes 93 are superimposed. Consequently, in the state in which the protrusions 91 are retained by the cut-outs 95, the bolts 87 are inserted through the through holes 93, and the installation plates 86A, 86B are fixed to the side wall 39 by screwing the bolts 87 into the threaded holes 89.

The support plate 85 is inclined with respect to the installation plates 86, and, by installing the installation plates 86 to the side wall 39, each of the light emitting elements 61 is disposed inclined with respect to the read-face of the original G.

A support 97 is formed at a length direction central portion of the support plate 85 to support a vibration damping member 96 that makes contact with the first mirror 75 in order to suppress vibration of the first mirror 75. The support 97 is integrally formed to the support plate 85, so as to be attached and detached from the side wall 39 integrally with the bracket 57. A cellular member, such as a sponge or the like, or a resilient member, such as rubber or the like, may be employed as the vibration damping member 96.

According to this configuration, when the first mirror 75 is installed, the vibration damping member 96 can be removed by the bracket 57 being removed, therefore installation of the first mirror 75 is facilitated, without the vibration damping member 96 getting in the way.

The bracket 57 is not limited to the configuration described above, and configuration may be made with other shapes and dispositions to that described above. The restricting member is not limited to the claws 92 formed to the bracket 57, and configurations may be employed with a member formed on the side wall 39 side, or with other shapes or dispositions from those of the claws 92.

Explanation will now be given of the installation operation of the bracket 57 to the side wall 39 of the first carriage 18.

Figure 10:
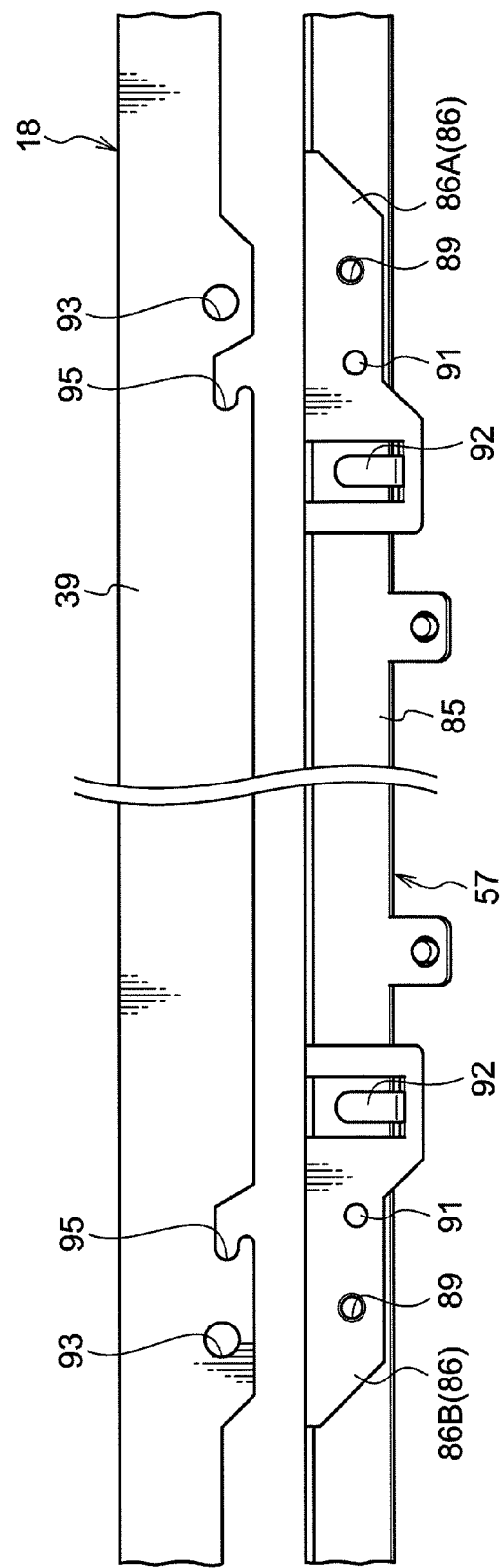
FIG. 10 is a side view showing a removed state of the bracket from the first carriage according to the exemplary embodiment.
Figure 11:
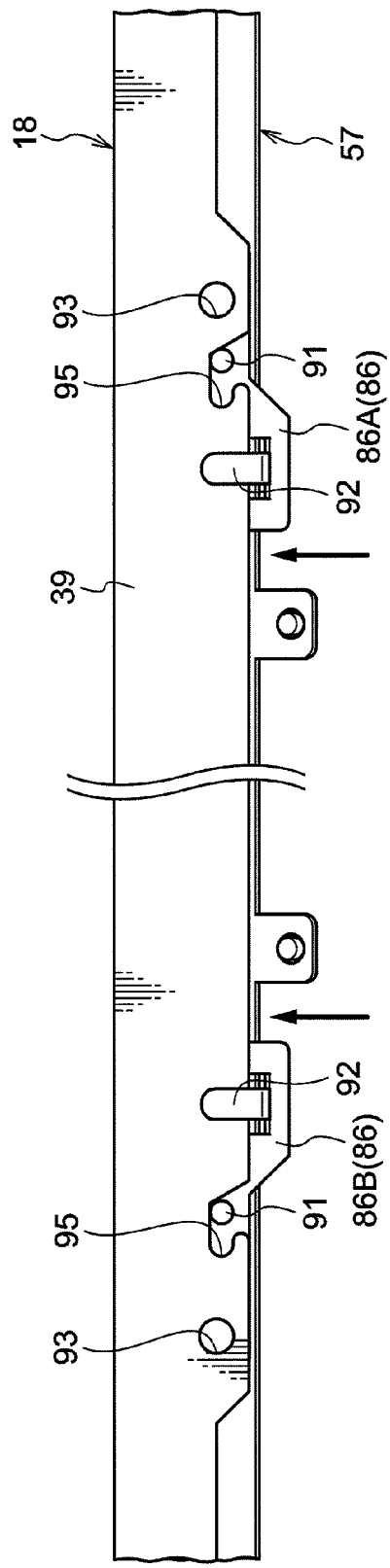
FIG. 11 is a side view showing the bracket according to the exemplary embodiment part way through installation to the first carriage.

First, as shown in FIG. 10, the bracket 57, in the removed state from the first carriage 18, is moved upwards from the bottom edge of the side wall 39 of the first carriage 18, as shown in FIG. 11, and the protrusions 91 are inserted into the cut-outs 95, and the side wall 39 is also inserted between the installation plates 86A, 86B and the two claws 92 (see FIG. 4).

When the protrusions 91 have been inserted into the cut-outs 95, as shown in FIG. 11, the protrusions 91 contacts the internal wall of the cut-outs 95 at the back in the projection 91 insertion direction (the upward direction in FIG. 11), restricting movement of the bracket 57 in the insertion direction. When the side wall 39 is inserted between the installation plates 86A, 86B and the two claws 92, as shown in FIG. 11, the bottom edge of the side wall 39 makes contact with the base portion of the claws 92, thereby restricting movement of the bracket 57 in the insertion direction (upwards).

In the state in which the side wall 39 is inserted between the installation plates 86A, 86B and the two claws 92, while movement of the bracket 57 is impeded along the installation plates 86 (side wall 39) thickness direction, movement along the length direction of the installation plates 86 (side wall 39) is permitted.

Figure 12:
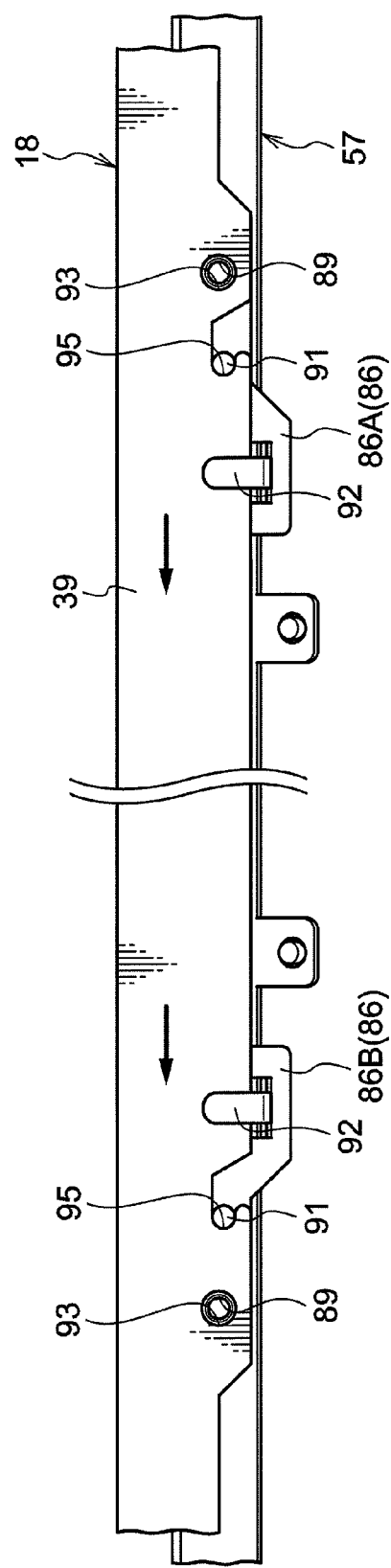
FIG. 12 is a side view showing an installed state of the bracket to the first carriage according to the exemplary embodiment.

Next, the first carriage 18 is moved towards one side in the side wall 39 length direction (the left side in FIG. 12). By this movement, the protrusions 91 are thereby guided to the recess of the cut-outs 95, and the protrusions 91 are retained at the recess of the cut-outs 95. In the retained state of the protrusions 91 in the cut-outs 95, the through holes 93 and the threaded holes 89 are superimposed, and the installation plates 86A, 86B are fixed to the side wall 39 by the bolts 87 inserted through the through holes 93 being screwed into the threaded holes 89.

In this manner, when the bracket 57 is installed to the side wall 39 of the first carriage 18, by restricting movement of the bracket 57 in the thickness direction of the installation plates 86 (side wall 39), as shown in FIG. 4, the light emitting elements 61 are suppressed from making contact with other components at the thickness direction side of the side wall 39 when seen from the perspective of the 39 (for example the light guide member 65).

Installation Structure of the Light guide member to the First Carriage

Explanation will now be given of an installation structure of the light guide member 65 to the first carriage 18.

Figure 13:
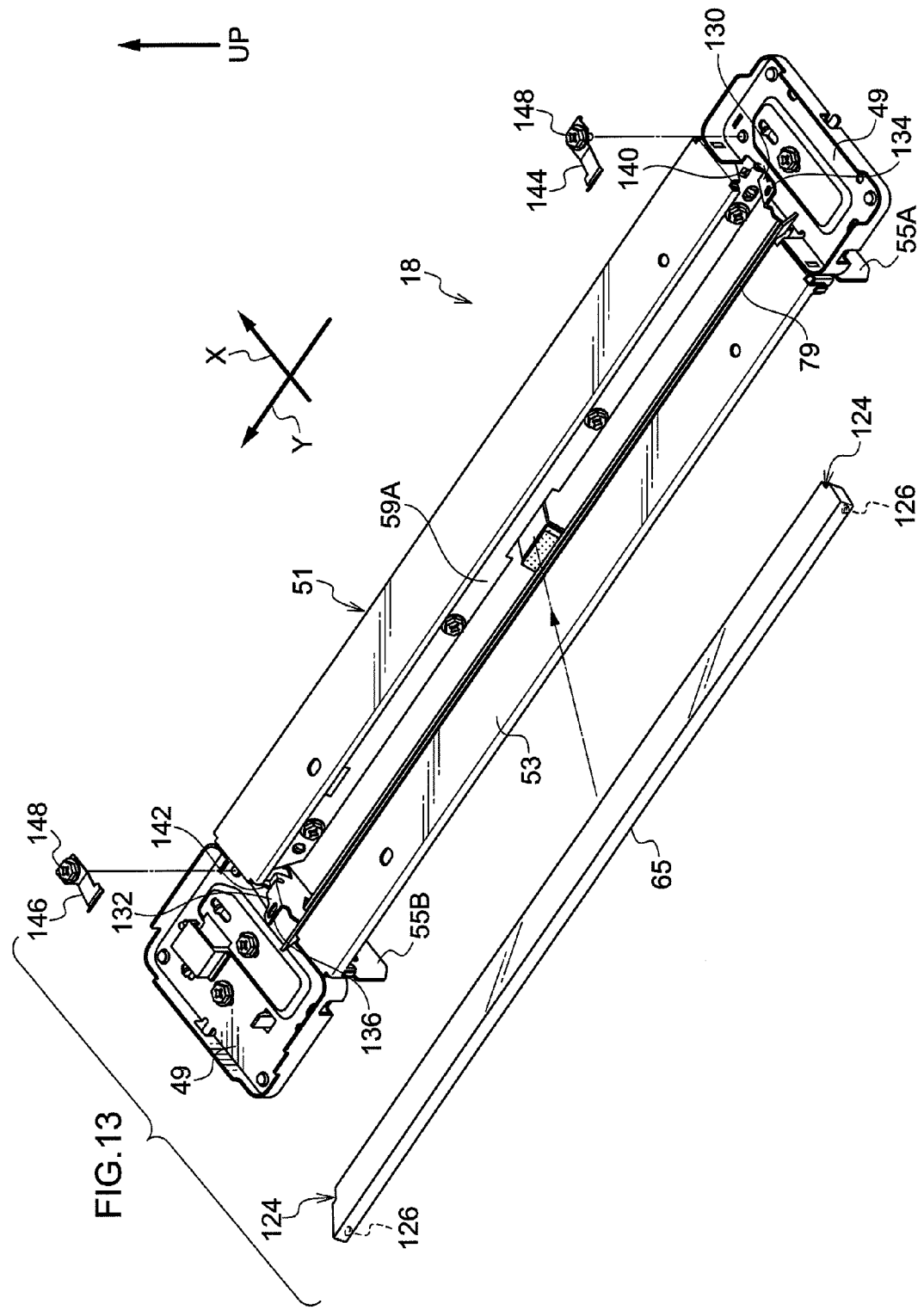
FIG. 13 is an exploded perspective view of the first carriage according to the exemplary embodiment.

The light guide member 65, as shown in FIG. 13, is moved diagonally in from obliquely above the first carriage 18, between the first top wall 51 and the second top wall 53, and towards the side plates 55A, 55B, so as to be installed to the side plates 55A, 55B.

Figure 14:
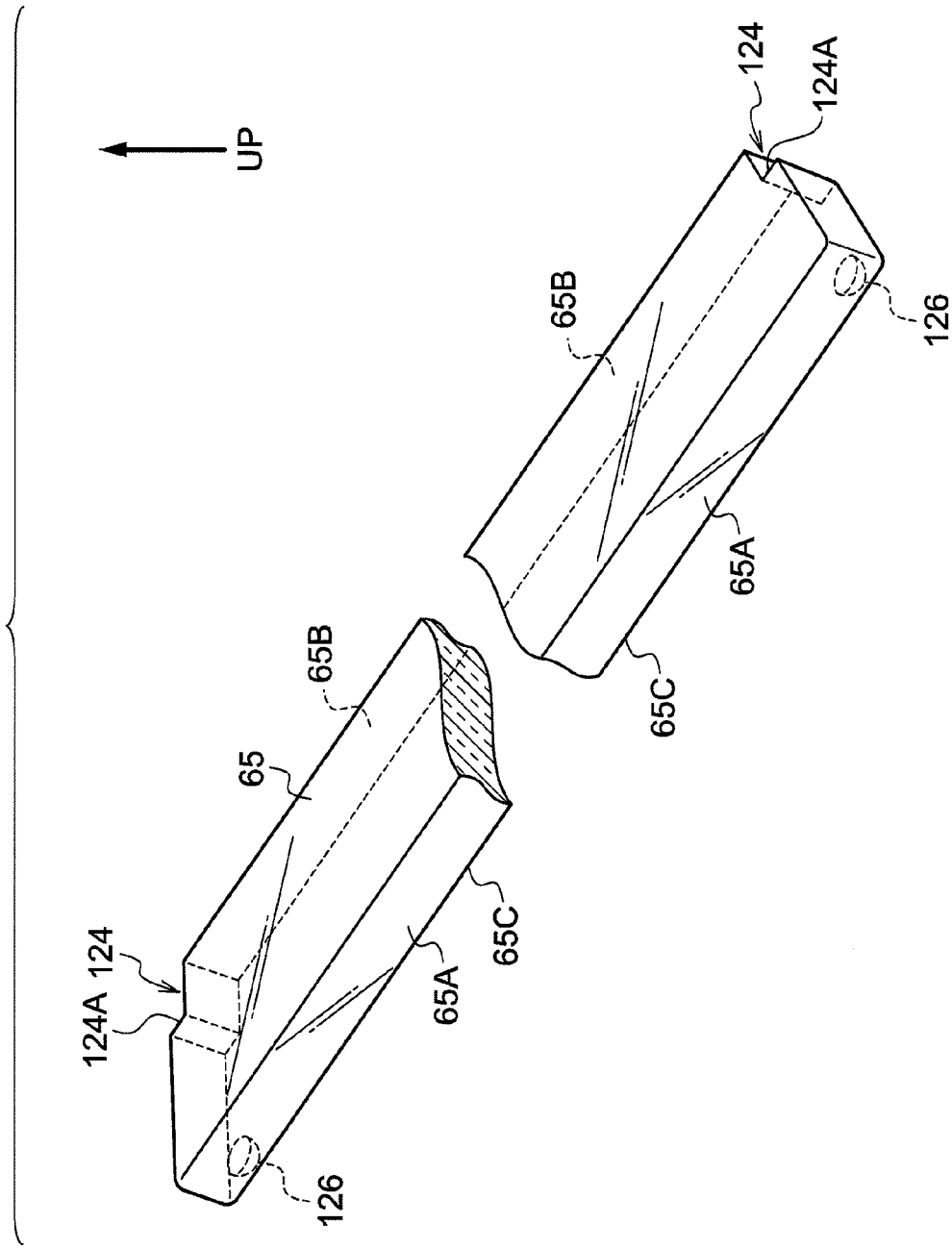
FIG. 14 is an enlarged perspective view of a light guide member according to the exemplary embodiment.

Step portions 124 are formed to an insertion face 65B side at the two length direction ends of the light guide member 65, as shown in FIG. 14, which is facing the light emitting elements 61 when in the installed state to the side plates 55A, 55B (see FIG. 4). The step portions 124 have end faces 124A that project out in the length direction from the light guide member 65 towards the two length direction ends, and face the light emitting elements 61.

In the installed state of the light guide member 65 to the side plates 55A, 55B (see FIG. 17 and FIG. 20), semi-spherical protrusions 126 are formed in the face (bottom face) 65C of the light guide member 65 facing the side plates 55A, 55B at both length direction ends of the light guide member 65.

Figure 15:
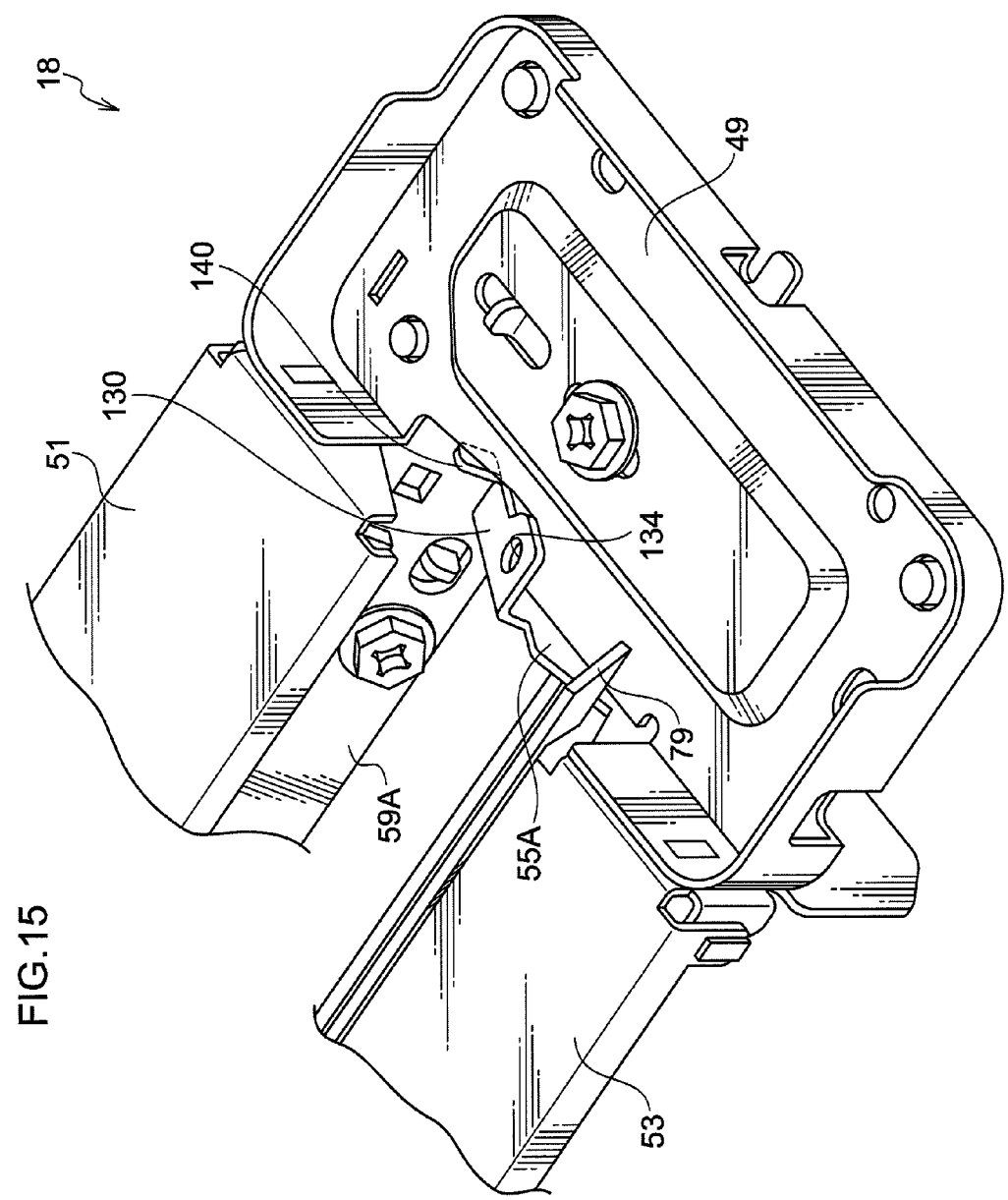
FIG. 15 is an enlarged perspective view showing a configuration for installing a light guide member to one of side plates according to the exemplary embodiment.
Figure 18:
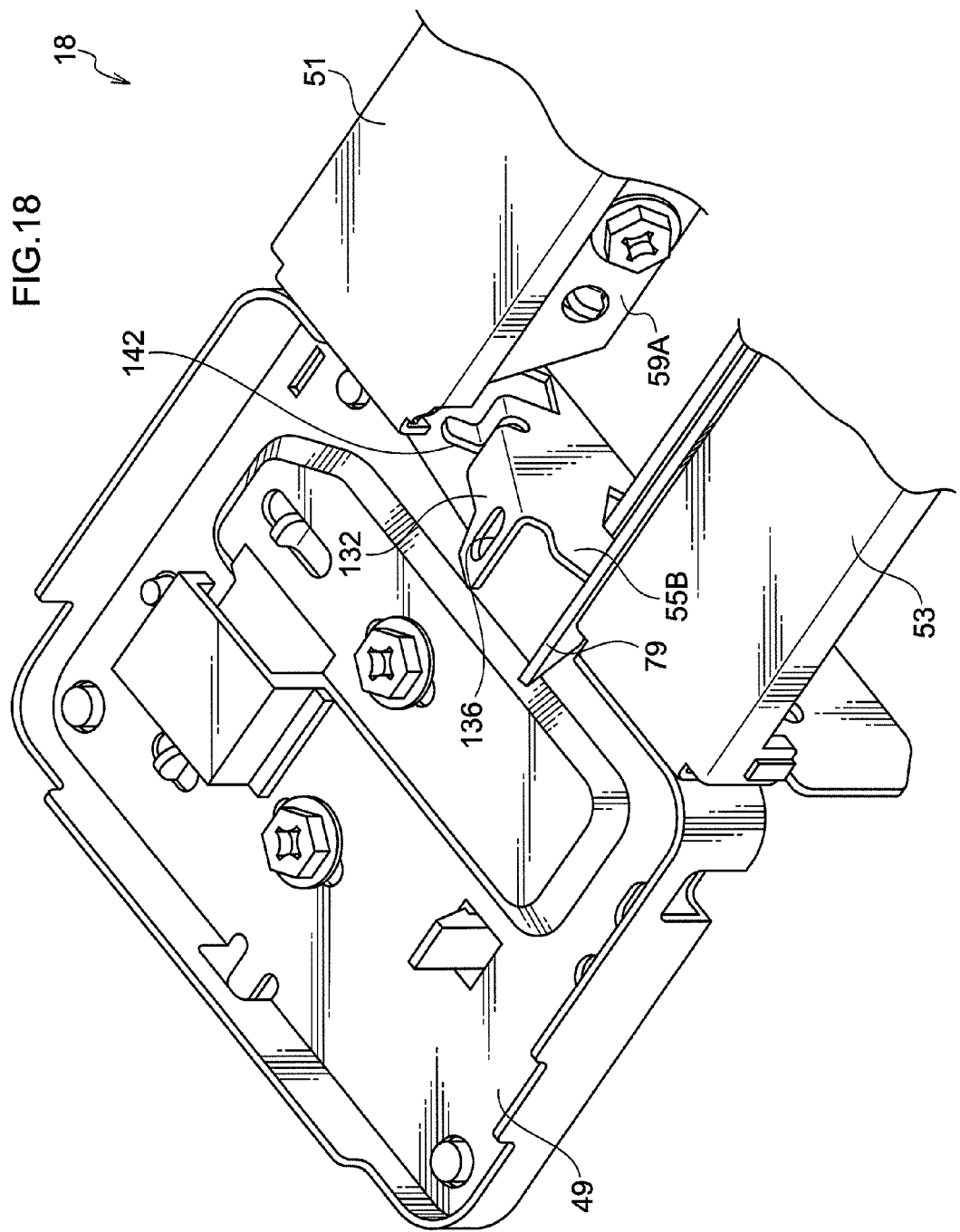
FIG. 18 is an enlarged perspective view showing a configuration for installing the light guide member to the other of the side plates according to the exemplary embodiment.

Mounting portions 130, 132 are formed to the side plate 55A and the side plate 55B, respectively, as shown in FIG. 13, FIG. 15 and FIG. 18, and both ends in the length direction of the bottom face 65C of the light guide member 65 are mounted to the mounting portions 130, 132.

Figure 16:
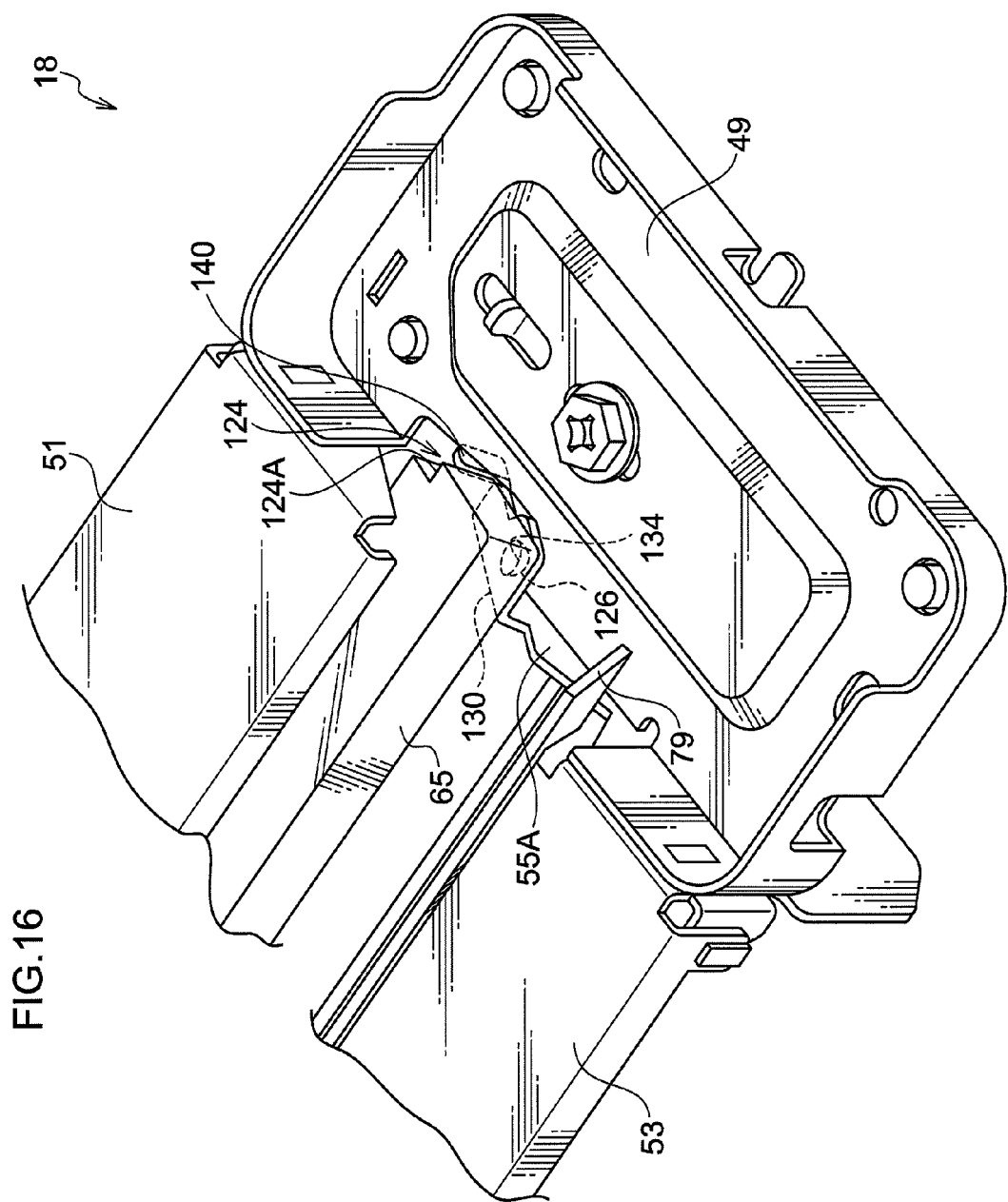
FIG. 16 is an enlarged perspective view in which the light guide member is in a mounted state on a mounting portion of the one of the side plates according to the exemplary embodiment.

As shown in FIG. 15 and FIG. 16, a circular through hole 134 is formed in the side plate 55A, into which the protrusion 126 formed to the bottom face 65C at one length direction end of the light guide member 65 is fitted, thereby restricting movement of the protrusion 126. One length direction end of the light guide member 65 is positioned by the protrusion 126 being fitted into the through hole 134.

As shown in FIG. 16, the end face 124A of the step portions 124 at one length direction end of the light guide member 65 contacts the side plate 55A, and a stopper 140 is formed to the side plate 55A, as an example of a restricting member that restricts movement of the light guide member 65 toward the light emitting elements 61 side.

Figure 17:
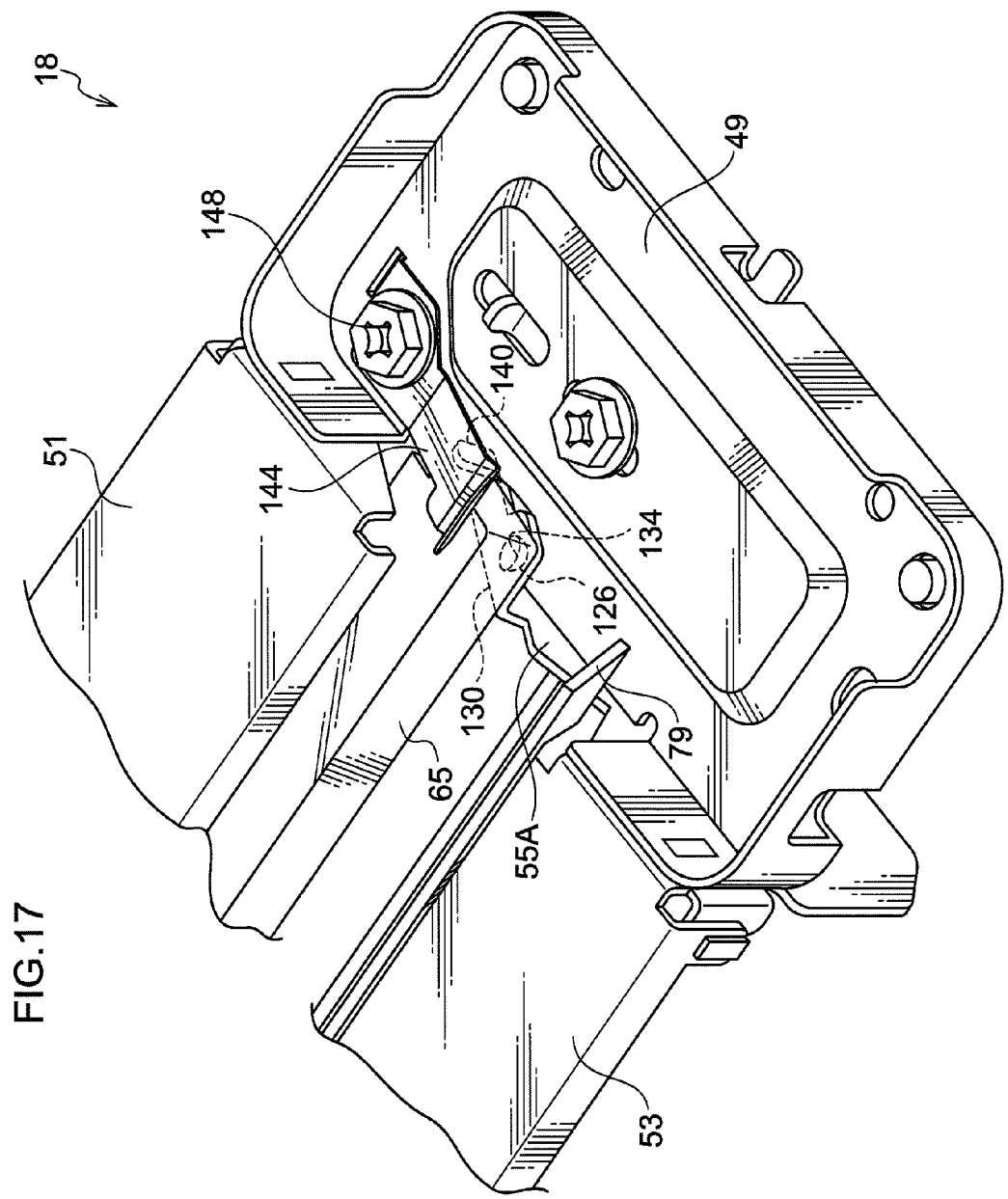
FIG. 17 is an enlarged perspective view showing the light guide member in a fixed state mounted on the mounting portion of the one of the side plates according to the exemplary embodiment.

As shown in FIG. 17, a leaf spring member 144 is provided to the support member 49 disposed at the side plate 55A side, as an example of a light guide fixing member that fixes the light guide member 65 in a direction other than the fixing direction of the bolts 87. The leaf spring member 144 presses one (first) length direction end of the light guide member 65 mounted on the mounting portion 130 against the mounting portion 130, thereby fixing the light guide member 65 to the side plate 55A. Specifically, one end of the leaf spring member 144 is fixed to the support member 49 by a bolt 148, and the other end of the leaf spring member 144 presses this length direction end of the light guide member 65 against the mounting portion 130, thereby fixing the light guide member 65.

Figure 19:
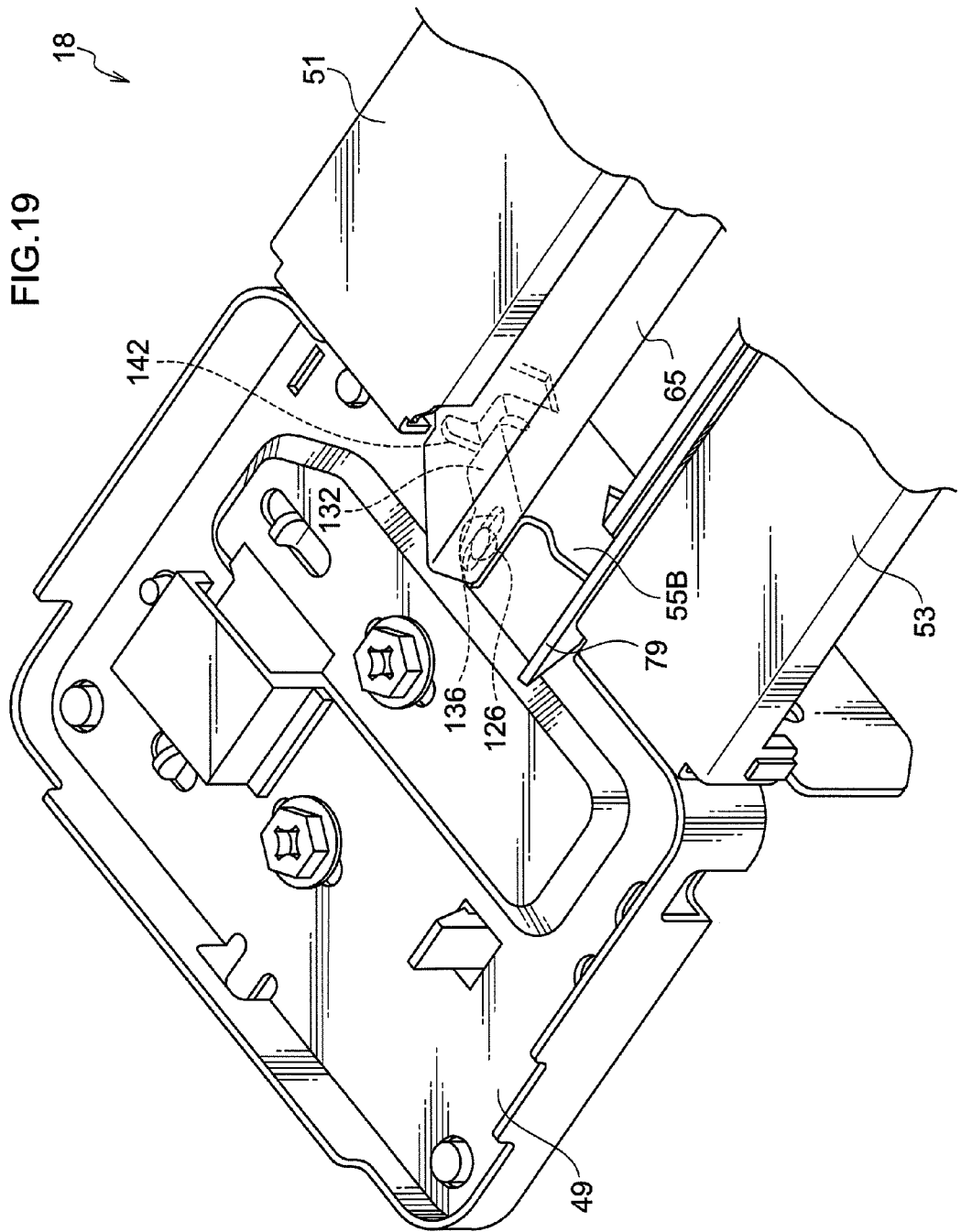
FIG. 19 is an enlarged perspective view showing the light guide member in a mounted state on a mounting portion of the other of the side plates according to the exemplary embodiment.

As shown in FIG. 18 and FIG. 19, a through hole 136 is formed in the side plate 55B, into which the protrusion 126 formed to the bottom face 65C at the other (second) length direction end of the light guide member 65 is fitted, thereby restricting movement of the protrusion 126 toward the light emitting elements 61 side and toward the opposite side thereto. The through hole 136 is a hole elongated along the light guide member 65 length direction, and permits movement of the protrusion 126 along the length direction of the light guide member 65.

The protrusion 126 can thereby move within the through hole 136 even if, due to heat expansion or the like, the light guide member 65 expands and contracts in the length direction.

As shown in FIG. 19, a stopper 142 is formed to the side plate 55B, as an example of a restricting member, and the stopper 142 contacts the end face 124A of the step portion 124 at the second length direction end of the light guide member 65, thereby restricting movement of the light guide member 65 toward the light emitting elements 61 side.

Furthermore, as shown in FIG. 20, a leaf spring member 146 is provided to the support member 49 disposed at the side plate 55B side, and the leaf spring member 146 presses the second length direction end of the light guide member 65 mounted on the mounting portion 132 against the mounting portion 132, thereby fixing the light guide member 65 to the side plate 55B. Specifically, one end of the leaf spring member 146 is fixed to the support member 49 by a bolt 148, and the other end of the leaf spring member 146 presses the second length direction end of the light guide member 65 against the mounting portion 132, thereby fixing the light guide member 65.

Explanation will now be given of the installation operation of the light guide member 65 to the side plates 55A, 55B of the first carriage 18.

First, as shown in FIG. 13, the light guide member 65 in the removed state from the first carriage 18, is moved diagonally in from obliquely above the first carriage 18, between the first top wall 51 and the second top wall 53, and towards the side plates 55A, 55B. The two length direction ends of the light guide member 65 are mounted to the mounting portion 130 of the side plate 55A and the mounting portion 132 of the side plate 55B.

In the state in which the two length direction ends of the light guide member 65 are mounted to the mounting portion 130 and the mounting portion 132, as shown in FIG. 16 and FIG. 19, the end faces 124A of the step portions 124 contact the stoppers 140, 142, and movement of the light guide member 65 toward the light emitting elements 61 is restricted. The light guide member 65 is thereby suppressed from making contact with the light emitting elements 61.

Then, as shown in FIG. 17 and FIG. 20, the two length direction ends of the light guide member 65 are pressed against the mounting portions 130, 132 by the one ends of the leaf spring members 144, 146 whose the other end is fixed to the support members 49, thereby fixing the light guide member 65 to the side plates 55A, 55B. In this way, the light guide member 65 is installed to the side plates 55A, 55B.

Furthermore, when the light guide member 65 is being installed to the side plates 55A, 55B, the reflection plate 79 is removed from the first carriage 18, and the reflection plate 79 is installed to the first carriage 18 after the light guide member 65 has been installed to the side plates 55A, 55B. Note that if the reflection plate 79 is configured such that it does not interfere when the light guide member 65 is being installed, an installation sequence may be adopted in which the light guide member 65 is installed to the first carriage 18 after the reflection plate 79 has been installed to the first carriage 18.

As described above, the light guide member 65 that guides light emitted from the light emitting elements 61 to the read-face of the original G is provided facing the light emitting face of the light emitting elements 61. Namely, there may be a case in which the light emitting elements 61 intrude into a light source placement region where the light emitting elements 61 are disposed, and there may be a possibility that when the light guide member 65 is attached and detached from the side plates 55A, 55B, the light guide member 65 making contact with the light emitting elements 61, thereby damaging the light-emitting face 65A of the light guide member 65.

However, in the exemplary embodiment, when the light guide member 65 is being mounted on the mounting portions 130, 132 or the when the light guide member 65 is being removed from the mounting portions 130, 132, the step portions 124, provided at the two ends of the light guide member 65, are supported by the stopper 140 and the stopper 142 formed to the side plates 55A, 55B, thereby restricting movement of the light guide member 65 towards the light emitting elements 61, and the light guide member 65 and the light emitting elements 61 do not make contact with each other.

By the step portions 124 at the two ends of the light guide member 65 being supported by the stoppers 140, 142 in this manner, the light guide member 65 is impeded from intruding into the light source placement region where the light emitting elements 61 are disposed, and contacting the light emitting elements 61.

Damage to the light guide member 65 is impeded by impeding contact of the light guide member 65 and the light emitting elements 61.

By impeding damage to the light guide member 65, the illumination light intensity illuminated onto the read-face of the original G by the light emitting elements 61 is made uniform across the read-face, and the intended latent image is formed to the surfaces of the photoreceptor drums 34.

Furthermore, by the installation structure of the light illumination section 59 to the first carriage 18, and the installation structure of the light guide member 65 to the first carriage 18, whereas the light illumination section 59 holding the light emitting elements 61 is installed to the side wall 39 of the first carriage 18 through the bracket 57, the light guide member 65 is independently and separately installed to the mounting portions 130, 132 of the side plates 55A, 55B of the first carriage 18. Accordingly, the side wall 39 of the first carriage 18 acts as a reference for positioning the light emitting elements 61, and the mounting portions 130, 132 of the side plates 55A, 55B act as references for positioning the light guide member 65, and the light emitting elements 61 and the light guide member 65 are each positioned by separate members.

The light illumination section 59 holding the light emitting elements 61 is installed to the side wall 39, via the bracket 57, by moving from the bottom of the first carriage 18 towards the top, and uninstalled from the first carriage 18 by moving down, out from the side wall 39. Namely, the attaching and detaching directions of the light illumination section 59 are in the vertical direction (the direction of arrow A in FIG. 4), and the light illumination section 59 is attached and detached from below the first carriage 18.

In contrast, the light guide member 65 is installed to the side plates 55A, 55B by moving diagonally downward between the first top wall 51 and the second top wall 53, and removed from the first carriage 18 by moving diagonally upwards from the side plates 55A, 55B. Namely, the attaching and detaching directions of the light guide member 65 are diagonal directions (the direction of arrow B in FIG. 4), and the light guide member 65 is attached and detached from above the first carriage 18.

Furthermore, whereas the light illumination section 59 holding the light emitting elements 61 is fixed, via the bracket 57, by the bolts 87 that run along the thickness direction of the side wall 39 of the first carriage 18, the light guide member 65 is fixed by being pressed against the mounting portions 130, 132, which are inclined with respect to the side wall 39, by the leaf spring members 144, 146. Namely, the light guide member 65 is fixed to the first carriage 18 in a different direction compared to the fixing direction of the light illumination section 59.

Note that in the exemplary embodiment, since the light L emitted from the light guide member 65 is dispersed and made uniform by the diffusion plate 67, there is less of a requirement for precision in assembly of the light emitting elements 61 and the light guide member 65 to the first carriage 18, in comparison to cases where the diffusion plate 67 is not provided.

Note that while detailed explanation has been given of the present invention by way of specific exemplary embodiments, the present invention is not limited to that of the exemplary embodiments. It will be clear to a person of ordinary skill in the art that various changes, modifications and improvements are possible, and that various other embodiments are possible within the scope of the present invention.

For example, in the exemplary embodiment, heat is transmitted to the bracket 57, formed as a sheet metal component, suppressing the temperature of the light illumination section 59 from becoming higher than necessary. However, the bracket is not necessarily formed as a sheet metal component, and as long as a component with high thermal transmission is employed, the component may be formed from, for example, silicon or the like.

Furthermore, whereas the light illumination section 59 and the bracket 57 of the exemplary embodiment are each fixed by four of the bolts 84, 87, respectively, as long as the light illumination section 59 is held in close contact with the bracket 57 even under thermal expansion, the fixing may be made at the two ends and at least one other location.

For example, whereas in the exemplary embodiment the step portions 124 provided at the two ends of the light guide member 65 made contact with the stoppers 140, 142, there is no particular limitation to the step portions 124, and, for example, projections may be provided that project outside from the two ends of the light guide member, with contact of these projections and support portions.

What is claimed is:

1. An image reading apparatus comprising:
   a casing;
   a light emitting section comprising a plurality of point light sources disposed in a row;
   a substrate in which the light emitting section is installed to a first face of the substrate;
   a support bracket that is installed to the casing and formed of a sheet metal, the support bracket directly contacting and supporting a first portion of a second face of the substrate that is a back side of the first face where the plurality of point light sources of the light emitting section is disposed, and the support bracket being bent so that a second portion of the second face of the substrate which is not contacting the support bracket, and a back side of a portion of the support bracket that is contacting the substrate, are exposed to an open space; and
   a light guide that is installed to the casing adjacent to the light emitting section, and that guides light from the light emitting section to a read-face.

2. The image reading apparatus of claim 1, wherein the support bracket is fixed to the substrate at three locations or more.

3. The image reading apparatus of claim 1, wherein the support bracket is configured so that when attaching or detaching the support bracket to or from the casing, the attaching and detaching movement directions are different from the direction in which the light guide is disposed.

4. The image reading apparatus of claim 1, wherein the light guide is configured so that when attaching or detaching the light guide to or from the casing, the attaching and detaching movement directions are different from a direction in which the light emitting section is disposed.

5. The image reading apparatus of claim 4, wherein a stopper portion is provided to the casing, the stopper portion making contact with a step portion provided to the light guide.

6. The image reading apparatus of claim 5, wherein the light guide extends along a direction of the row of point light sources in the light emitting section, and the step portion is provided at both length direction ends of the light guide.

7. The image reading apparatus of claim 3, wherein:
   the support bracket is formed from a plate member and comprises a claw that projects out from the plate member and runs along the plate member; and
   the claw is configured to impede movement of the support bracket along a plate member thickness direction when the support bracket is being attached to or detached from the casing.

8. An image forming apparatus comprising:
   the image reading apparatus of claim 1 further comprising a reading unit that reads in an image on a read-face; and
   an image forming section that forms an image based on data of the image read in by the reading unit.

9. The image forming apparatus of claim 8, wherein a stopper portion is provided on the casing of the image reading apparatus, and the stopper portion makes contact with a step portion provided to the light guide.

10. The image forming apparatus of claim 8, wherein:
    the support bracket of the image reading apparatus is formed from a plate member and comprises a claw that projects out from the plate member and runs along the plate member; and
    the claw is configured to impede movement of the support bracket along a plate member thickness direction when the support bracket is being attached to or detached from the casing.

* * * * *